US012457244B2

(12) United States Patent
P J et al.

(10) Patent No.: US 12,457,244 B2
(45) Date of Patent: Oct. 28, 2025

(54) TECHNIQUES FOR PROCESSING QUERIES RELATED TO NETWORK SECURITY

(71) Applicant: Salesforce, inc., San Francisco, CA (US)

(72) Inventors: Jose Lejin P J, Bangalore (IN); Tanmay Singh, Bangalore (IN); Prabhat Singh, San Francisco, CA (US); Megha Dixit, Hyderabad (IN); Ramanjaneyulu Y Talla, Bangalore (IN); Anmol Arora, Vancouver (CA)

(73) Assignee: Salesforce, Inc., San Francisco, CA (US)

( * ) Notice: Subject to any disclaimer, the term of this patent is extended or adjusted under 35 U.S.C. 154(b) by 298 days.

(21) Appl. No.: 18/162,436

(22) Filed: Jan. 31, 2023

(65) Prior Publication Data

US 2024/0259430 A1    Aug. 1, 2024

(51) Int. Cl.
*H04L 9/40* (2022.01)
*G06F 16/242* (2019.01)
*G06F 16/2455* (2019.01)
*G06F 16/248* (2019.01)

(52) U.S. Cl.
CPC ............ *H04L 63/20* (2013.01); *G06F 16/243* (2019.01); *G06F 16/2455* (2019.01); *G06F 16/248* (2019.01)

(58) Field of Classification Search
None
See application file for complete search history.

(56) References Cited

U.S. PATENT DOCUMENTS

| | | | | |
|---|---|---|---|---|
| 9,176,949 B2* | 11/2015 | Bullock | .................. | G06F 40/30 |
| 11,966,854 B2* | 4/2024 | Kochura | ................. | G06N 3/044 |
| 12,205,105 B2* | 1/2025 | Harrison | .............. | G06Q 20/367 |
| 12,255,925 B2* | 3/2025 | Monni | .................... | H04L 63/20 |
| 12,256,039 B2* | 3/2025 | Bansal | ................ | H04M 3/2209 |
| 12,278,740 B2* | 4/2025 | Joshi | ....................... | G06Q 50/10 |
| 12,294,589 B2* | 5/2025 | Rao | ....................... | H04L 63/1466 |
| 12,335,851 B2* | 6/2025 | Khare | .................. | H04W 48/16 |

(Continued)

OTHER PUBLICATIONS

Social Media Based NPL System (Year: 2017).*
Policy-based Security Using Software-defined Networking (Year: 2016).*

*Primary Examiner* — Kim T Nguyen
(74) *Attorney, Agent, or Firm* — Holland & Hart LLP

(57) ABSTRACT

Methods and systems for data processing and troubleshooting at a query management service are described. The query management service may receive, via a proxy between the query management service and a communication service, an indication of a query from a user of the communication service. The query management service may determine an intent of the query based on using a third-party natural language processing (NLP) model and customized logic to analyze the query. The query management service may obtain query results based on executing, within a distributed computing environment that includes the query management service and a set of multi-substrate network security services, a sequence of actions, that correspond to the intent of the query. The query management service may transmit an indication of the query results to the communication service, where the query results are rendered according to feedback information received from the user.

20 Claims, 11 Drawing Sheets

(56) References Cited

U.S. PATENT DOCUMENTS

| | | | |
|---|---|---|---|
| 2019/0205726 A1* | 7/2019 | Khabiri | G06N 3/006 |
| 2021/0360393 A1* | 11/2021 | Nair | H04W 12/106 |
| 2022/0272111 A1* | 8/2022 | Rao | H04L 63/1433 |
| 2022/0284064 A1* | 9/2022 | Shaw | G06F 16/9535 |
| 2024/0070483 A1* | 2/2024 | Kochura | G06F 16/9024 |
| 2024/0259429 A1* | 8/2024 | Monni | H04L 63/101 |
| 2024/0259430 A1* | 8/2024 | P J | G06F 16/2455 |
| 2025/0016194 A1* | 1/2025 | P J | H04L 63/0263 |
| 2025/0039155 A1* | 1/2025 | Bansal | H04L 63/0414 |
| 2025/0193244 A1* | 6/2025 | Singh | G06F 40/40 |

* cited by examiner

 Sage APP 5 minutes ago    305

Looks like you want to run a pipeline. Please confirm by replying with @Sage yes/no.

 User 3 minutes ago    310

@Sage yes

 Sage APP < 1 minute ago    315

Could you please help me with the following data for Pipeline Run? I have tried to extract some data from your message.

Please press Submit after verifying/updating the values to proceed.

---

Source Instance      [ dev1-usw2  v ]

Functional Domain

[ core_0457 ]

Service Name

[                                    ]

Account Number

[                                    ]

Pull Request Link (Optional)

[                                    ]

Additional Details (Optional)

[                                    ]

☐ Skip Validation of Domain/Service
   Check this for new Domain/Service accounts

---

☐ Urgent Request
   Check this if your request is urgent

[ Submit ] [ Cancel ]

TECHNIQUES FOR PROCESSING QUERIES RELATED TO NETWORK SECURITY

FIELD OF TECHNOLOGY

The present disclosure relates generally to database systems and data processing, and more specifically to techniques for processing queries related to network security using Natural Language Processing (NLP).

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.). The cloud platform can be spread over multiple substrates also.

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cloud computing systems, administrative users or end customers, may handle queries and requests that pertain to network security. However, manually resolving these queries may be time consuming, redundant, inefficient, and error-prone. Furthermore, administrative users may be unable to curate or format responses based on user preferences or feedback.

BRIEF DESCRIPTION OF THE DRAWINGS

FIG. 3 illustrates an example of a messaging interface that supports techniques for processing queries related to network security in accordance with aspects of the present disclosure.

FIG. 4 illustrates an example of a dashboard interface that supports techniques for processing queries related to network security in accordance with aspects of the present disclosure.

DETAILED DESCRIPTION

Figure 1:
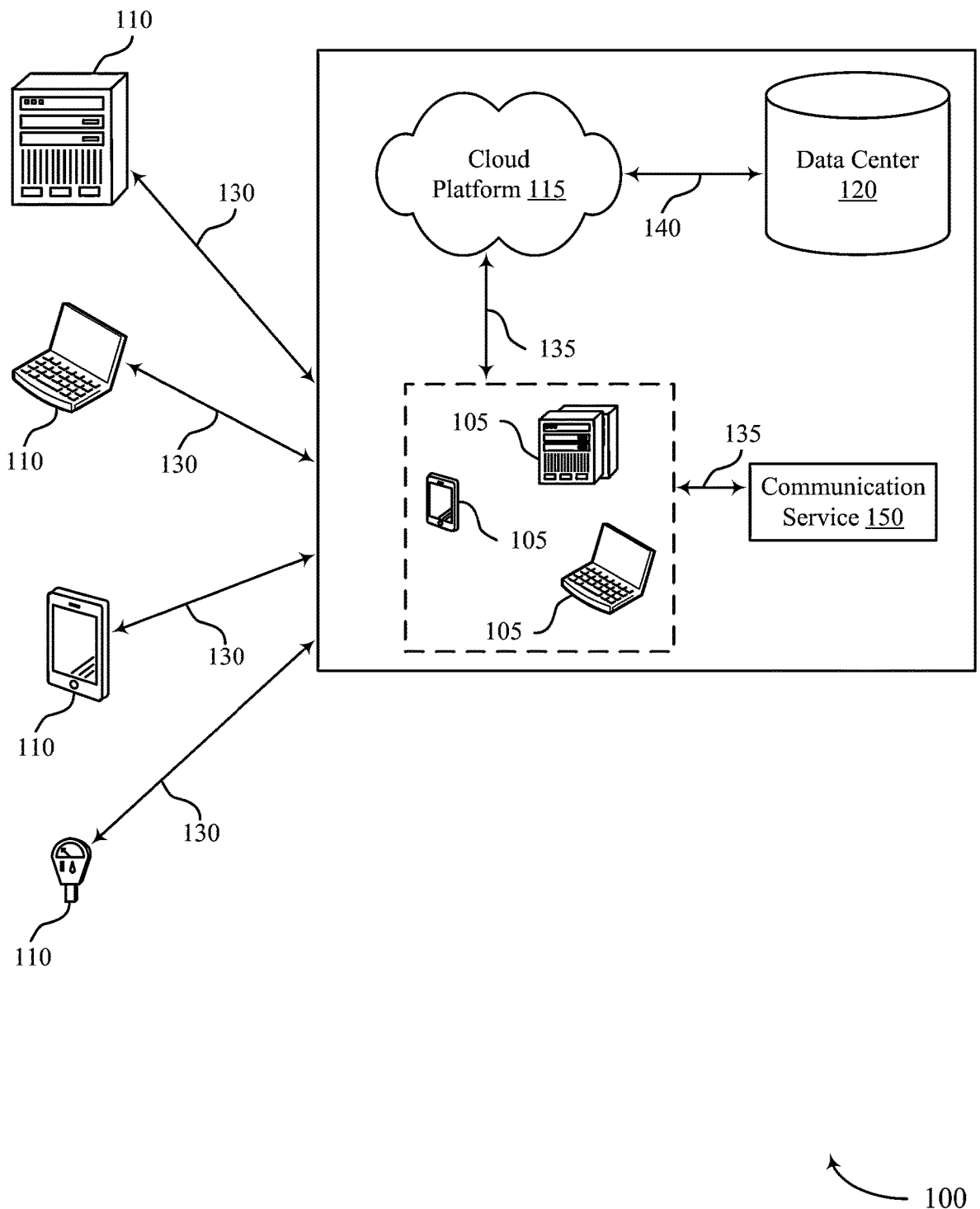
FIGS. 1 and 2 illustrate examples of computing environments that support techniques for processing queries related to network security in accordance with aspects of the present disclosure.

A cloud computing system may employ a variety of services to configure, maintain, and update the security posture of the cloud computing system. These services may perform security-related tasks such as, for example, verifying that a given internet protocol (IP) packet is from an authorized IP address, connecting new IP addresses to an existing network security service, creating/enforcing tenant-specific network security policies, debugging network connection issues, checking and configuring network settings, etc. Some of these services may be implemented using a multi-substrate cloud architecture. As described herein, a substrate may refer to the infrastructure underlying a particular service instance, such as a public cloud infrastructure or a physical data center infrastructure managed by an organization. A substrate may be defined by (i.e., composed of) elements such as a data center, network, system architecture, storage component, rack provisioning, hardware configuration, or the like. A substrate forms the base layer on which all higher-layer products and services in an organization can operate.

In some cases, users of a cloud computing system may have network security-related queries and/or requests. For example, a user may want to adjust approval settings for a particular service or determine whether a given service is reachable from a corporate network. In conventional cloud computing systems, such queries are directed to another user, such as a network security engineer or a system administrator. Manually resolving such queries may be prohibitively time-consuming for larger systems in which hundreds or thousands of queries are generated each day. Furthermore, relying on other users to handle network security-related issues may introduce unacceptable delays, errors, and system vulnerabilities.

The techniques described herein provide for using a query management service (referred to herein as Sage) to autonomously process network security-related queries from users of a cloud computing environment, which may be spread across multiple substrates. The query management service may be integrated with various third-party tools and services such that the query management service can automatically perform various network-security related actions (for example, retrieving connectivity status information or creating a new policy for a service instance) without manual intervention. In accordance with the techniques described herein, an end user (such as a client or administrator of the cloud computing environment) may enter a network security-related query via a user interface of a communication service (such as a third-party messaging application).

After receiving the query from the communication service, the query management service may use a third-party natural language processing (NLP) model to analyze the query and determine the intent of the query. For example, the NLP model may determine that the end user (from which the query originated) is attempting to execute a pipeline run, get a pull request approved, open/close a work item, etc. Once the intent is determined, the query management service may execute various pre-configured actions to retrieve information, update policies, diagnose network issues, manage configurations etc. Thereafter, the query management service may return query results to the user via the communication service. For example, the query management service may post or otherwise display an indication of requested policy details, error log information, diagnostic results, or the like.

Aspects of the present disclosure may be implemented to realize one or more of the following advantages. The query management service described herein may automatically interpret and process network security related-queries (which may be related to multiple substrate components) from users of a communication service, thereby reducing the number of network security-related queries that are manually resolved by system administrators or network security engineers. Furthermore, using a query management service to autonomously handle requests related to network security may enable end users to obtain query results, troubleshoot connectivity issues, and/or submit service requests in real-time (i.e., without waiting for another user to manually resolve each query). The query management service described herein may also customize query results according to feedback provided by end users, resulting in higher user satisfaction and improved user experience.

Aspects of the present disclosure are initially described in the context of computing environments, messaging interfaces, dashboard interfaces, and process flows. Aspects of the present disclosure are further illustrated by and described with reference to apparatus diagrams, system diagrams, and flowcharts that support techniques for processing queries related to network security.

FIG. 1 illustrates an example of a computing environment 100 that supports techniques for processing queries related to network security in accordance with various aspects of the present disclosure. The computing environment 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server, a smartphone, or a laptop. In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction 130. The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server, a laptop, a smartphone, or a sensor. In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

The cloud platform 115 may include cloud clients 105, servers, and data center 120. In some cases, data processing may occur at any of the components of the cloud platform 115, or at a combination of these components. In some cases, servers may perform the data processing. The servers may be a cloud client 105 or located at data center 120.

The computing environment 100 may be an example of a multi-tenant system. For example, the computing environment 100 may store data and provide applications, solutions, or any other functionality for multiple tenants concurrently. A tenant may be an example of a group of users (e.g., an organization) associated with a same tenant identifier (ID) who share access, privileges, or both for the computing environment 100. The computing environment 100 may effectively separate data and processes for a first tenant from data and processes for other tenants using a system architecture, logic, or both that support secure multi-tenancy. In some examples, the computing environment 100 may include or be an example of a multi-tenant database system.

A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the computing environment 100 may run a single instance of software on a processing device (e.g., a server, server cluster, virtual machine) to serve multiple tenants. Such a multi-tenant system may provide for efficient integrations (e.g., using APIs) by applying the integrations to the same software application and underlying architectures supporting multiple tenants. In some cases, processing resources, memory resources, or both may be shared by multiple tenants.

As described herein, the computing environment 100 may support any configuration for providing multi-tenant functionality. For example, the computing environment 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The computing environment 100 may support scaling of tenants within the multi-tenant system, for example, using scale triggers, automatic scaling procedures, scaling requests, or any combination thereof. In some cases, the computing environment 100 may implement one or more scaling rules to enable relatively fair sharing of resources across tenants. For example, a tenant may have a threshold quantity of processing resources, memory resources, or both to use, which in some cases may be tied to a subscription by the tenant.

In accordance with aspects of the present disclosure, a query management service supported by the cloud platform 115 may receive an indication of a query from a user of a communication service 150 via a public proxy between the query management service and the communication service 150. The query management service may determine an intent of the query based on using a third-party NLP model to analyze the query received from the communication service 150. The query management service may obtain query results by executing, within the computing environment 100, a sequence of actions that correspond to the intent of the query. The query management service may transmit an indication of the query results to the communication service 150 via the public proxy, where the query results are rendered according to feedback information provided by the user.

The computing environment 100 may be an example of a multi-substrate computing system. As described herein, a substrate is an underlying infrastructure, such as a public cloud infrastructure like Amazon Web Services (AWS), Google Cloud Platform (GCP), Microsoft Azure, AliCloud, etc. A substrate may also refer to a physical data center infrastructure managed by an organization. A substrate is composed of a data center, network, storage, rack provisioning, architecture, and hardware engineering disciplines. A substrate forms the base layer for all the products in organization to operate and innovate on.

It should be appreciated by a person skilled in the art that one or more aspects of the disclosure may be implemented in a computing environment 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
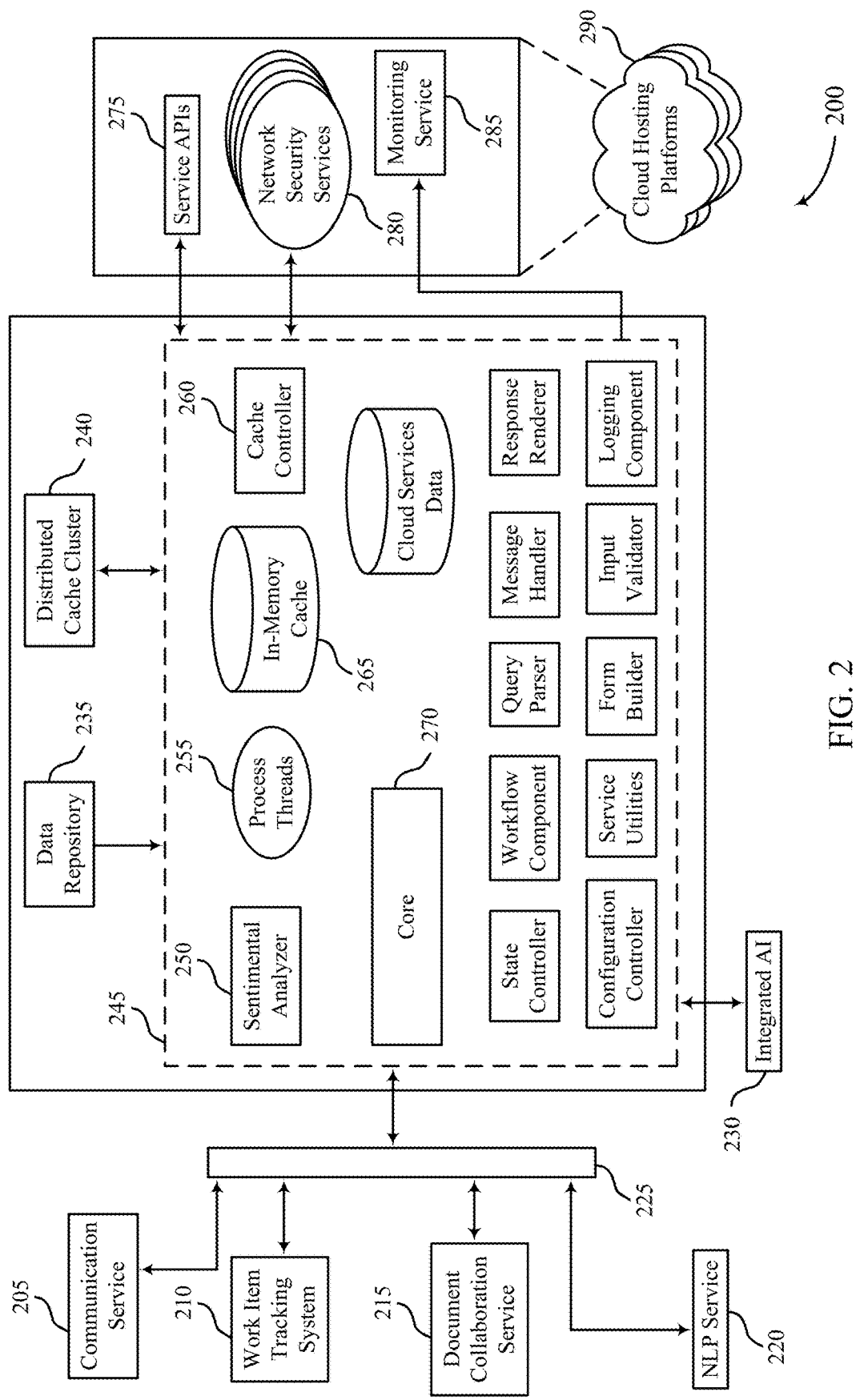

FIG. 2 illustrates an example of a computing environment 200 that supports techniques for processing queries related to network security in accordance with aspects of the present disclosure. The computing environment 200 may implement or be implemented by aspects of the computing environment 100. For example, the computing environment 200 includes a query management service 245, which may be supported by one or more components of the cloud platform 115 described with reference to FIG. 1. The computing environment 200 also includes a communication service 205, which may be an example of the communication service 150 described with reference to FIG. 1. The computing environment 200 may be an example of a distributed (i.e., multi-cloud) computing system that supports automatic query resolution for queries applicable to multiple substrates.

In the example of FIG. 2, the query management service 245 (also referred to as Sage or Sage bot/service) may receive and parse message events, evaluate the intent of the messaging events, and perform corresponding actions (for example, making calls to service APIs 275, network security services 280, and other third-party services managed by cloud hosting platforms 290). The query management service 245 may resolve network security-related queries in a fully automated manner, format query responses to enhance user experience, and provide customized results for display in the communication service 205.

The data repository 235 (equivalently referred to herein as Vault Service) may store credentials that the query management service 245 uses to access different APIs. The monitoring/logging service 285 may store metrics and logs published from different sources like Spinnaker, internal services, etc. The monitoring/logging service 285 may have metrics for network security service pipeline runs that can be used to answer queries and automated debugging. The monitoring/logging service 285 may be integrated with other services (i.e., Argus) and provide alerts for different sets of metrics. The monitoring/logging service 285 may provide on-demand alerts to service owners based on network security service queries.

The query management service 245 may use a public proxy 225 to communicate with third-party services and applications, such as the communication service 205 (i.e., Slack), a work item tracking system 210, a document collaboration service 215, and an NLP service 220, among other examples. All internet requests may go through the public proxy 225. For services and applications outside the system (such as the NLP service 220 and the communication service 205), requests may go through the public proxy 225.

The NLP service 220 may be an example of a third-party NLP service that provides conversational artificial intelligence (AI) capabilities. The NLP service 220 can extract intent from message events received by the query management service 245. Any third-party NLP service (such as Amazon Lex) can be used to perform this NLP analysis.

Internally, the query management service 245 may function as a single process with 3 threads. One of the process threads 255 does periodic data and configuration sync-ups, one of the process threads 255 does network security posture data sync-ups, and one of the process threads 255 is dedicated for handling customized cache operations (e.g., eviction). In some implementations, the query management service 245 may use customized eviction and cache cleaning mechanisms that offer improved performance over standard methods where the least recently used objects are evicted. To speed up operations in the communication service 205 (e.g., Slack), a cache controller 260 can maintain an in-memory cache 265. If a deployment is done on multiple pods, the in-memory cache 265 may be synched to a distributed cache cluster 240 (i.e., a Redis cluster or any suitable third-party distributed cache) such that all instances have similar cache data.

The core component 270 of the query management service 245 leverages multiple sub-components (such as a state controller, a workflow component, a query parser, a message handler, a response handler, a configuration controller, a service utilities component, a form builder, an input validator, and a logging component) to interpret and process queries from the communication service 205. The sentimental analyzer 250 may be configured to perform a sentimental analysis of end users (i.e., customers) based on historic feedback information, which helps improve the pertinence of subsequent responses.

The communication service 205 may support a variety of APIs, such as Event/Socket Mode APIs and real-time messaging (RTM) APIs. These APIs and programming paradigms can be used to resolve issues on the communication service 205. The automated query resolution techniques described herein may leverage bidirectional communication and Socket Mode Event API(s) to handle queries related to network security.

The query management service 245 can be deployed either as a standalone application or as a service within a Kubernetes cluster in any of the substrates. The service language/framework used for the query management service 245 may employ a generic object-oriented design such that third-party applications and services can be easily integrated with the query management service 245, which can be generalized for any number of use cases. In some implementations, the query management service 245 may resolve primary queries in a recursive manner, for example, by communicating with an integrated AI 230 (e.g., an external application or Slack bot) for dependent queries.

The computing environment 200 may support various software development kits (SDKs) such as Python, Node, and Java. Additionally, there are community-developed libraries that provide similar assistance for languages like C#, Go, .NET, and others. In some implementations, it may be preferable to use an official SDK supported by the computing environment 200. In one example, the query management service 245 may be written in Python.

FIG. 3 illustrates an example of a messaging interface 300 that supports techniques for processing queries related to network security in accordance with aspects of the present disclosure. The messaging interface 300 may implement or be implemented by aspects of the computing environment 100 or the computing environment 200. For example, the messaging interface 300 may be displayed to a user of the communication service 150 and/or the communication service 205, as described with reference to FIGS. 1 and 2. The messaging interface 300 may illustrate an example of a workflow-based interaction, where a query management service (such as the query management service 245 described with reference to FIG. 2) provides an end user with customized (and, in some cases, pre-populated) user interface forms.

As described herein with reference to FIGS. 1 and 2, a network security team may receive a large number of queries and questions from service owners who want to know the state of their network security posture (which may be spread across multiple substrates). Service owners may also request assistance with defining security policies and/or troubleshooting issues across multiple substrates, network security services, etc. Many of these queries can be retrieved from the system state and intelligent co-relations. As the rate of deployment increases at the multi-cloud level, the manual effort required to handle these queries may increase proportionately.

The automated query resolution mechanisms disclosed herein may support automatic triaging of network security-related issues spread across multiple substrates, network security services, etc. This may help network security teams provide better service for network security products, and may provide more visibility into existing network configurations, policy deployments, security states, mitigations, etc. The query management service described herein may also be referred to as Sage. The Sage service may be an example of a Slack bot that helps with multiple network security solutions spread across multiple cloud substrates and related queries in public Slack support channels. The Sage bot may provide improved user experience and NLP-based message handling to solve operations-related queries in a fully automated manner.

Sage may provide end users with the capability to perform operations like getting a pull request approved for a change review, implementing a pipeline run, handling a connectivity query, performing an error check, checking the status of a pipeline run, getting help information, suggesting security groups, debugging connection failures, fixing spinnaker errors, fixing network security-related errors, handling public proxy errors, getting manual help, answering general questions related to network security services, getting statistics of network security services, and getting random jokes.

When organizations onboard services to a multi-substrate cloud environment (referred to herein as Falcon), the organizations may implement changes in configuration files located in a distributed version control system, such as Git. After all changes are made and merged, Falcon Instance Repeatable Environment (FIRE) Bill of Materials (BOM) hydration takes place, which involves collecting all data needed for Falcon realization. FIRE BOM hydration creates relevant multi-substrate cloud accounts and adds metadata for each cloud-formed data center/service. Each cloud-formed data center may have a corresponding FIRE BOM. After the FIRE BOM is hydrated, a network security solution service may create terraform artifacts to apply a specific policy. This network security solution service runs periodically (i.e., every 30 minutes), and utilizes information from other repositories associated with different cloud-formed data centers. The periodic run time can be configured by administrators.

The terraform plan may be executed by another pipeline that runs periodically (i.e., every 24 hours) and applies specific policies in multi-substrate cloud data centers. The periodic run time of this pipeline can also be configured by administrators. As there may be a time difference between hydration of FIRE BOM, development of terraform artifacts, and terraform plan execution, the status of the service may be indeterminate. Once deployed, the system may need to determine the current state, security policies, mitigations, the protection status, and other details related to the service. Hence, it may be beneficial to design an intelligent and interactive interface that enables end users to handle different types of queries/requests, and helps organizations process, orchestrate, manage, and monitor network security controls across the cloud infrastructure, which may spread across multiple substrates.

As illustrated in the example of FIG. 3, a consolidated dialog form 315 may be sent to a user in response to a query submitted by the user. More specifically, if the user posts a query related to network security operations, the Sage service may post a message 305 asking the user to confirm or deny the intent of the original query (e.g., get a pull request approved, initiate a pipeline run). If, for example, the user responds with a message 310 and confirms the original intent of the query, the Sage service may post the consolidated dialog form 315. In some implementations, Sage may pre-populate one or more elements of the consolidated dialog form 315 with features/information extracted from the original query. This may reduce the amount of manual input needed to complete the consolidated dialog form 315 (thereby alleviating the burden on the user asking the query), and may provide the on-call user/engineer with a single data source to refer to.

The search functionality of Slack (and other messaging platforms), which may be customized by Sage, enables users to locate similar queries that have been asked, thereby removing the dependency of end users on on-call users/engineers and reducing the number of queries the on-call user/engineer is responsible for. Workflows provide users with more control over the queries they ask, and provide users with relevant data. Daily reminder messages from the Sage bot may be posted to Slack channel(s). The Sage service may also promote error pop-ups with guided correction. Additionally, Sage may populate specific fields such as substrate entities, network security parameters, etc. Furthermore, Sage may support progress indicators for tasks, on-call engineer alerts, intuitive search options, organized support ticket user experience, consolidated report user experience, etc.

Figure 4:
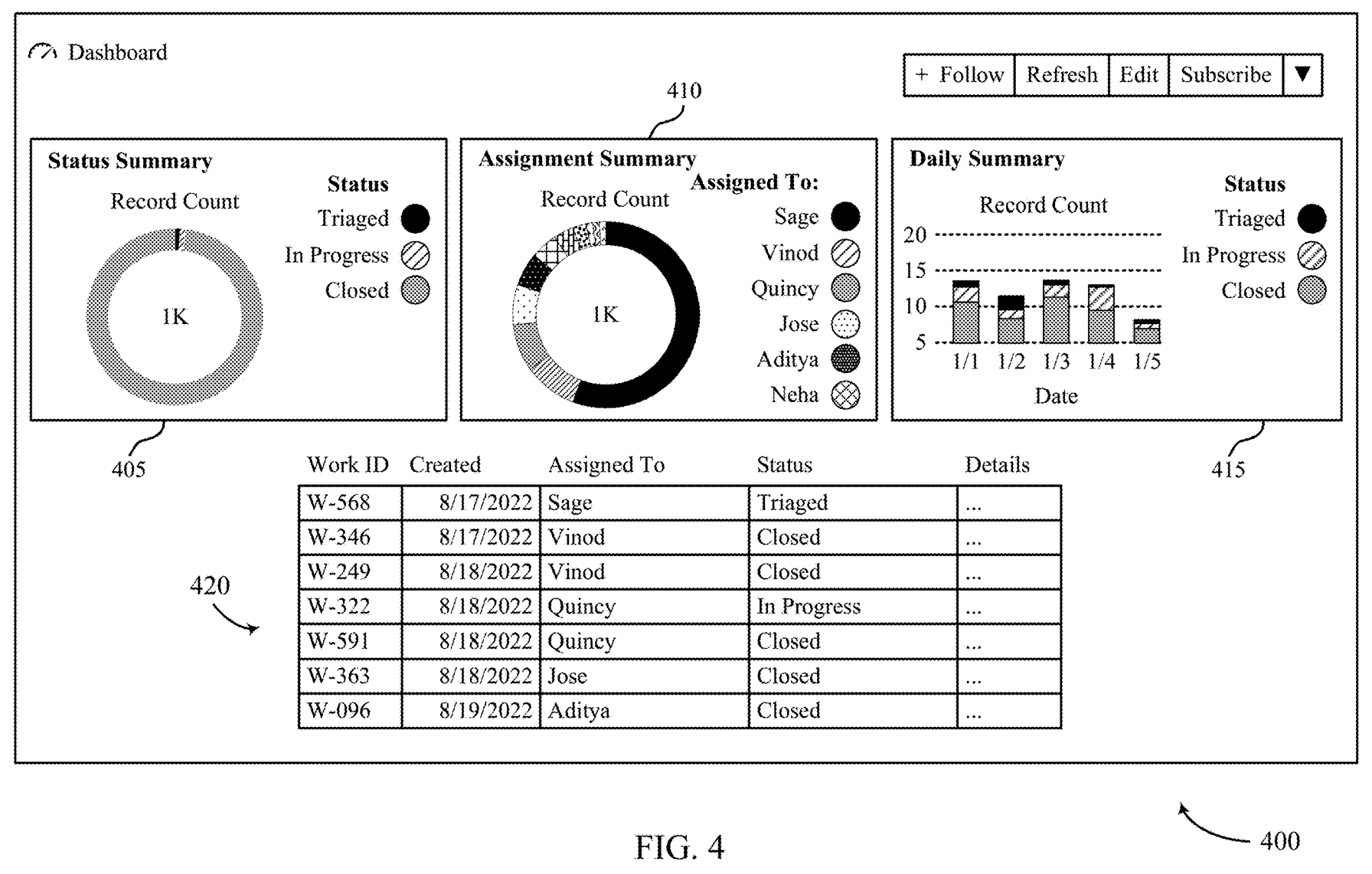

FIG. 4 illustrates an example of a dashboard interface 400 that supports techniques for processing queries related to network security in accordance with aspects of the present disclosure. The dashboard interface 400 may implement or be implemented by aspects of the computing environment 100, the computing environment 200, and/or the messaging interface 300. For example, the dashboard interface 400 may be displayed to a network security engineer or an administrator of a cloud computing system (such as the cloud platform 115 described with reference to FIG. 1). The content and/or format of the dashboard interface 400 may be customized according to user feedback, historic usage information, user type, etc. The various metrics and reports illustrated in the dashboard interface 400 may be generated by a query management service (such as the query management service 245 described with reference to FIG. 2).

As described herein with reference to FIGS. 1 through 3, an automated query resolution service (referred to herein as Sage) may provide an end-to-end solution for zero-touch triaging of network security-related queries in a cloud computing infrastructure spread across multiple substrates, such as AWS Cloud, Microsoft Azure, GCP, Ali Cloud, private data centers, etc. Sage may support an intent-based query handling system focused on overall user experience. Sage may provide automatic query handling that improves customer experience for all network security products and provides visibility into existing network configurations, policy deployments, etc. Sage may also process/handle user intent based on NLP algorithms that are specific to network security-related queries.

Additionally, Sage may be capable of mapping user intent based on network security service parameters (including auto-detection of service-related states in the query). Sage may use automated NLP score tuning to improve query responses based on historic user feedback to previous query responses, thereby improving the understanding of the correct intent of the user. Sage can be integrated with any number of third-party NLP or machine learning (ML) tools to process and handle chat utterances with in-built NLP handlers. As described with reference to FIG. 6, Sage may support flexible conversation and workflow interaction modes that provide different user experiences.

Other features/functions supported by Sage include corrections and suggestions to user queries based on data in services, sentimental analysis of customers based on query response (which can improve the pertinence of subsequent query responses), curated responses to end users (which may be internally related to multiple network security services and possibly other external information/services), user-curated responses by collecting details from various network security services, innovative mechanisms for communicating with other sub-systems through multiple services spread across multiple substrates for auto-resolving user queries related to security pipeline runs, connectivity checks, pull request review approval, error case resolution, general questions, network security status check, network security configuration, building network security policy, etc.

Sage may also provide users with network security policy deployment information by detecting/scanning across services spread over multiple substrates. In addition, Sage can provide solutions to generic queries that are dependent on multiple network security services spread across multiple substrates by analyzing/interpreting user utterances and mapping these utterances to corresponding query intents, as described with reference to FIG. 6.

In some implementations, Sage may be capable of reporting the status of a network policy deployment spread over multiple substrates, handling/updating the basic configuration(s) of network security policies spread over multiple substrates, helping with traffic issue triaging and troubleshooting across multiple substrates, etc. Sage may be extendible to perform analysis across network security services spread across multiple substrates (such as the network security services 280 described with reference to FIG. 2) for user queries to provide asynchronous responses and alerts to end users.

Sage may be configured to perform automatic scaling based on the number of queries received per minute. If the number of incoming queries increases, Sage may auto-scale and load balance the incoming queries to provide low-latency (i.e., real-time) responses to end users. As illustrated in the example of FIG. 4, Sage may also be configured to generate and display detailed reports on Sage activities and other query resolution statistics. For example, dashboard interface 400 includes a status summary report 405, an assignment summary report 410, a daily summary report 415, and a work item table 420.

The status summary report 405 may indicate the status of queries, requests, and/or work items (collectively referred to as records) received in a given time period (e.g., the last 24 hours). The status of a record may be triaged, in-progress, closed, etc. As described herein, triaging a query may involve conducting a preliminary evaluation of the query to determine the type (i.e., intent) and urgency of the query such that the query can be processed accordingly. In some examples, Sage may triage a query by providing pre-processing information to an end user (such as a notification that Sage is actively handling the query) or opening a work item on behalf of the end user (such that the query can be handled by an on-call engineer). The queries handled by Sage may be recorded by self-service-type work items that Sage can use to generate statistical reports.

The assignment summary report 410 may indicate the number of records received in a given time period as well as the percentage of records that were assigned to each on-call administrator/engineer. The daily summary report 415 may indicate the number and status of records received/processed each day over the course of a given time period (such as the last week or month). The work item table 420 may include details from specific records, such as a work item identifier, a record creation date, the name of the on-call engineer to whom the record was assigned, the status of the record, and other pertinent information.

Figure 5:
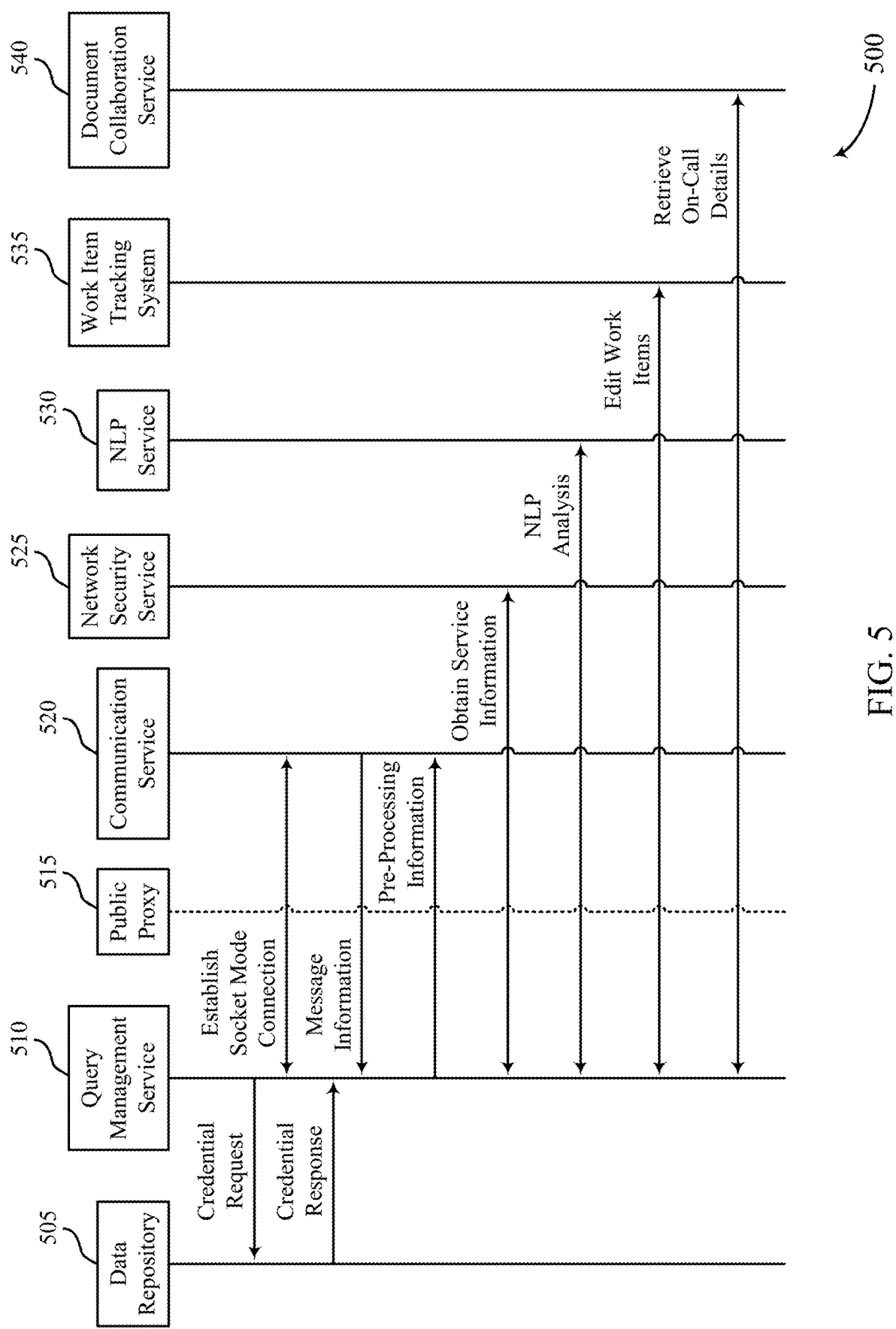
FIGS. 5 and 6 illustrate examples of process flows that support techniques for processing queries related to network security in accordance with aspects of the present disclosure.

FIG. 5 illustrates an example of a process flow 500 that supports techniques for processing queries related to network security in accordance with aspects of the present disclosure. The process flow 500 may implement or be implemented by aspects of any of the computing environments, messaging interfaces, or dashboard interfaces described with reference to FIGS. 1 through 4. For example, the process flow 500 includes a query management service 510, which may be an example of the query management service 245 described with reference to FIG. 2. The process flow 500 also includes a communication service 520, which may be an example of the communication service 205 described with reference to FIG. 2. In the following description of the process flow 500, operations may be added, omitted, or performed in a different order (with respect to the exemplary order shown).

The process flow 500 shows an exemplary sequence of operations for starting the query management service 510. On start-up, the query management service 510 may configure all necessary settings, for example, by retrieving credentials from a data repository 505 (also referred to as a vault service). The query management service 510 may use these credentials to access various APIs within a distributed cloud infrastructure. The data repository 505 may be secured with in-built authentication capabilities/functions.

The query management service 510 may then establish a connection with the communication service 520 (i.e., a Slack Events API) via a public proxy 515 using a Slack web client or similar interface. After the query management service 510 establishes a socket connection with the communication service 520, the query management service 510 can actively monitor (i.e., listen to) messages that mention the query management service 510 (e.g., the Sage bot) in different messaging channels like Slack channels. The query management service 510 may use this socket connection to establish bidirectional communications with the communication service 520. In some implementations, connection management may not be required, as underlying messaging systems like Slack libraries can be used to manage these aspects.

Accordingly, the query management service 510 may receive message information (e.g., a Slack event notification) associated with a query that relates to network security operations. The query management service 510 may use a third-party NLP service 530 (such as Amazon Lex) to determine the intent of the query, as described with reference to FIG. 6. Once the intent of the query is determined, the query management service 510 can respond accordingly (for example, by gathering data from other services/systems). In some implementations, the query management service 510 may transmit pre-processing information (such as an estimated response time or a request for more information) back to the communication service 520 before handling/processing the query.

In some examples, the query management service 510 may recursively contact other Slack bots for dependent queries related to primary queries. For example, if the query management service 510 asks a first Slack bot for additional information, the first Slack bot may ask another Slack bot for other details, which may contact another Slack bot (as instructed by the query management service 510) to obtain the desired results. This process can be used if, for example, another Slack bot can be reached by an intermediate Slack bot (but not by the query management service 510).

The query management service 510 may establish respective socket connections with a work item tracking system 535 (i.e., Salesforce GUS), a document collaboration service 540) (i.e., Salesforce Quip), the NLP service 530 (i.e., Amazon Lex) and other network security services 525 spread across multiple cloud substrates. The query management service 510 may also obtain service-related information via a service API. For example, the query management service 510 may retrieve details on a particular service instance (equivalently referred to herein as a Falcon instance), such as a functional domain name or a service type associated with a service instance. Additionally, or alternatively, the query management service 510 may retrieve information from a monitoring/logging service (i.e., Argus) that tracks metrics for network security service pipeline runs. In some examples, the query management service 510 may retrieve on-call details from the document collaboration service 540 and notify the on-call engineer based on the on-call schedule. An on-call user/engineer may be involved if manual resolution is needed. Otherwise, all queries will be automatically handled by the query management service 510.

As described herein, Falcon may refer to a public cloud architecture that balances developer agility, security, and cost to serve. A Falcon instance is an implementation of Falcon, a trusted public cloud environment that includes the minimum requirements for functional domains to be instantiated. A Falcon instance includes Falcon foundation services, and may be associated with a substrate (e.g., GCP, AWS, Azure), region, environment type (e.g., production, test, development), and specific attributes. A functional domain is a logical boundary around a set of capabilities, features, and/or services that can be built and delivered independently. Functional domains have consumable interfaces that can either be internally or externally exposed. Functional domains can be used to enable a Services Development Model. Services can be composed into applications and saleable products. Functional domains may be based on a domain-driven design methodology. Falcon foundation is a defined set of capabilities that opens an instance for business for a functional domain to be deployed in a trusted and cost-efficient manner. There are primary capabilities included in the Falcon foundation that are used by all functional domains within a Falcon instance. There may also be secondary capabilities that are available for functional domains to leverage (but are not required to be used).

The query management service 510 can be used for troubleshooting and other situations where users are experiencing errors. Additionally, or alternatively, the query management service 510 can help resolve queries related to security pipeline runs, connectivity checks, pull request review approval, error case resolution, general questions, mitigations, status information, building network security policy, etc. If, for example, a query includes a request for pull request review approval or a pipeline run, the query management service 510 may post a consolidated dialog form into the appropriate Slack channel (as shown in the example of FIG. 3). The query management service 510 may also support configurable on-demand alerts for service owners based on network security service queries.

In some implementations, the query management service 510 may access an in-memory cache (such as the in-memory cache 265 described with reference to FIG. 2) that is synchronized with a distributed cache cluster (i.e., Redis), thereby ensuring high cache availability, scalability, and resilience. Internally, one instance of the query management service 510 may run as a single process with 3 threads operating in parallel. One thread may handle periodic data and configuration synchronization, one thread may handle network security posture data synchronization, and one thread may be dedicated to handling cache operations. The query management service 510 may use these parallel threads to formulate appropriate responses to queries.

The query management service 510 may support automated NLP score tuning based on query resolution answer history and automatic scaling based on the number of incoming queries per minute. As more queries arrive, the query management service 510 can auto-scale and load balance incoming queries to provide timely responses to end users. As described with reference to FIG. 4, the query management service 510 may generate detailed reports of automated query processing statistics. These dynamic dashboards (such as the dashboard interface 400 described with reference to FIG. 4) can be customized based on user preferences, feedback, etc. As such, different administrative users may be presented with different dashboards. In some examples, the query management service 510 may enable users to customize/edit dashboard features as needed.

The query management service 510 may support both workflow and conversational interactions. In workflow mode, the query management service 510 may provide customized user interface forms for workflow input from the user. The user interface forms presented to the end user may be customized based on historical usage and the type of end user. In conversation mode, the query management service 510 may respond to chat utterances with query results, follow-up questions, customized forms, and/or conversational feedback that is customized per the historical usage and type of the end user.

Figure 6:
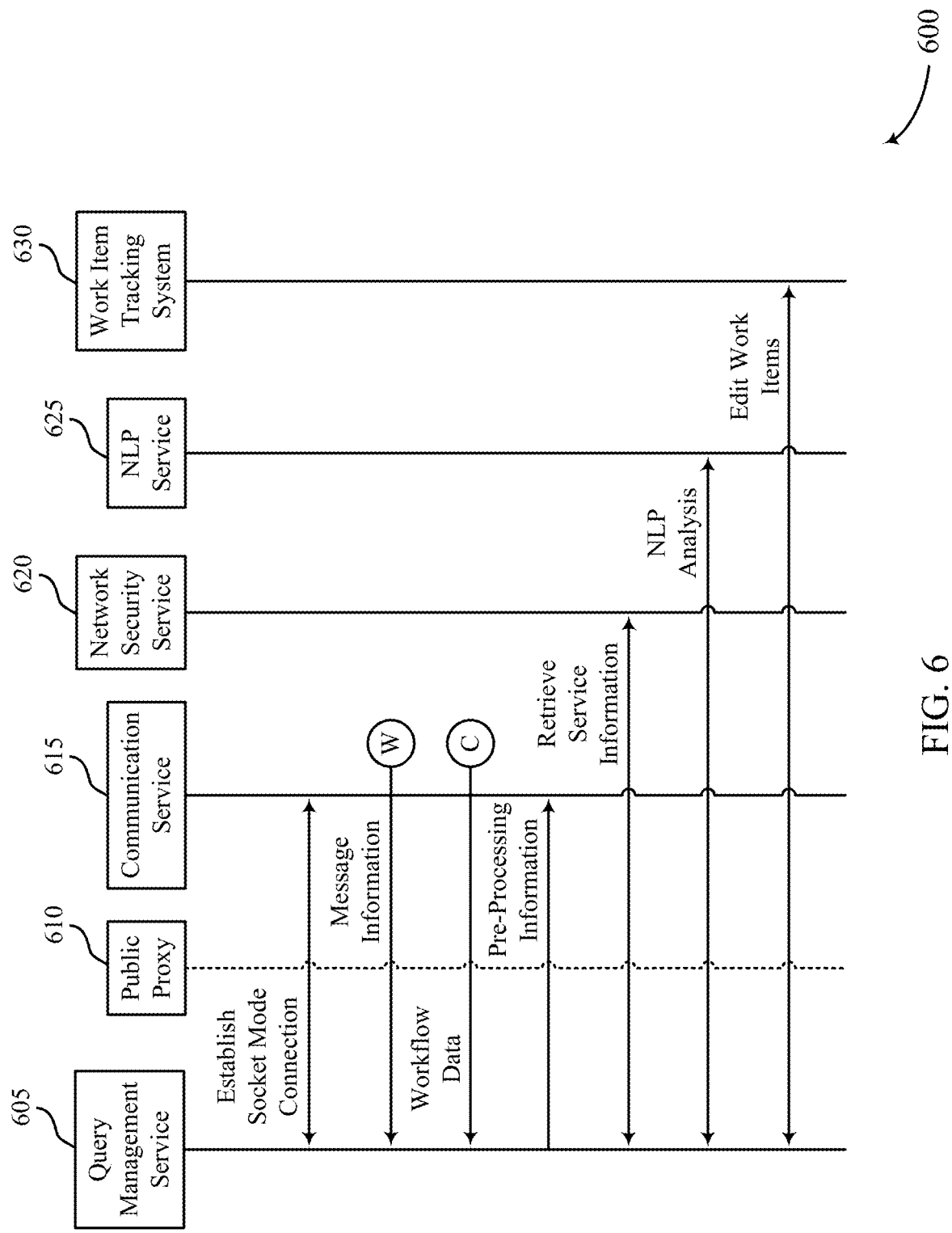

FIG. 6 illustrates an example of a process flow 600 that supports techniques for processing queries related to network security in accordance with aspects of the present disclosure. The process flow 600 may implement or be implemented by aspects of any of the computing environments, messaging interfaces, dashboard interfaces, or process flows described with reference to FIGS. 1 through 5. For example, the process flow 600 includes a query management service 605, which may be an example of the query management service 510 described with reference to FIG. 5. The process flow 600 also includes a communication service 615, which may be an example of the communication service 520 described with reference to FIG. 5. In the following description of the process flow 600, operations may be added, omitted, or performed in a different order (with respect to the exemplary order shown).

As described with reference to FIGS. 1 through 5, the query management service 605 (referred to herein as Sage) may support two different interaction modes, a conversation-based interaction mode and a workflow-based interaction mode. The process flow 600 illustrates exemplary sequences for both workflow and conversation-based operating modes. both modes enable users to provide feedback so the query management service 605 can be iteratively improved. The workflow-based interaction mode enables users to choose between four basic workflow options based on the type of query they submit. The workflow will open a dialog in which the user can fill in any requisite data before sharing the workflow request in the Slack channel. The conversational mode can be used to provide chat-based responses to user queries.

In accordance with the techniques described herein, the query management service 605 may establish a connection with the communication service 615 (i.e., a Slack Events API) via a public proxy 610 using a Slack web client or similar interface. After the query management service 605 establishes a socket connection with the communication service 615, the query management service 605 can actively monitor (i.e., listen to) messages that mention the query management service 605 (e.g., the Sage bot) in different Slack channels. The query management service 605 may use this socket connection to establish bidirectional communications with the communication service 615. In some implementations, connection management may not be required, as underlying Slack libraries can be used to manage these aspects.

Accordingly, the query management service 605 may receive workflow data and/or message information associated with queries that relate to network security operations. The query management service 605 may use a third-party NLP service 625 (such as Amazon Lex) to determine/evaluate the intent of the query. Table 1 includes a list of exemplary user inputs (i.e., chat utterances) and corresponding query intents.

TABLE 1

| Mapping User Input to Query Intent | | |
|---|---|---|
| Example User Input | Query Intent | Intent Description |
| "need approval on my pr" "pr require approval" | pr_approval | Approve pull request |
| "rerun pipeline" "run pipeline for me" | pipeline_run | Run network security pipeline |
| "manual help" "get me expert help" | get_expert_help | Get manual help |
| "close ticket" "close this" | close_ticket | Ask Sage to close work item |

TABLE 1-continued

Mapping User Input to Query Intent

| Example User Input | Query Intent | Intent Description |
| --- | --- | --- |
| "is my service reachable from corp network" | confirm_corp_reachable | Check the service connectivity from corporate network |
| "what local clusters are available in a data center" "what clusters are available in this data center" | get_functional_domains | Check available functional domains in a falcon instance |
| "list all services reachable from my service" "read all reachable services list" | get_services | Check all services that can connect from a service |
| "is there connectivity between my service" "can you please check the connection between services" | connectivity_query | Check connectivity between two services |
| "NetSec pipeline status" "pipeline last run" | pipeline_info | Get network security pipeline status for service |
| "enumerate fi" "list all available falcon instances" | get_falcon_instances | Get all available falcon instances |
| "public proxy issue" "outbound access errors" | check_public_proxy | Help when you have a public issue |
| "We're getting the error:" "found a problem" | error | Help user debug errors or failures |
| "share with me FAQs" "need help on sage" | sage_info | Get information about Sage |
| "access service on corp" "service access within corp network" | corp_network_access_info | Get help on corporate access |
| "access service in another functional domain" "how to access service in another data centers/inside isolations" | inter_cluster_access_info | Get help on inter-functional domain access |
| "how can I access the internet" "internet access" | internet_access_info | Get help on internet access |
| "how do I define ports for my service" "what port is my service running on" | listening_ports_info | Get help on listening ports |
| "how to create a new network policy" "how to edit my network policy" | network_policies_info | Get help on network policies |
| "when is NetSec office hour" "need info on office hour" | office_hours_info | Get help on network security office hours |
| "what are security groups" | security_groups_info | Get help on security groups |
| "what is specific NetSec service" "how does specific NetSec service work" | netsec_service_info | Get help on network security services |
| "how can I access another service in same data centers/inside clusters" "intra-cluster access" | intra_cluster_access_info | Get help on intra-functional domain access |
| "how to integrate with specific NetSec service" "Specific NetSec service onboarding" | netsec_service_onboarding_info | Get help on onboarding to specific network security service |
| "what is falcon" "how can I get support for falcon" | falcon_info | Help with falcon information |
| "which security group should I put my service in" | get_security_groups | Help find which security group should be used for a particular service |
| "how to attach security group to my service" "attach security groups to service" | how_to_attach_security_groups_info | Help attaching security group to a service |

The query intent mapping techniques disclosed herein may be supported by a third-party NLP service 625, which can be locally/internally customized by the query management service 605. The third-party NLP service 625 may help the query management service 605 establish the context and appropriate course of action for a given request. The query management service 605 may also extract key features from the query and provide this information to the on-call engineer (such that the on-call engineer can manually resolve the underlying issue at a later time).

Once the intent of the query is determined and/or confirmed, the query management service 605 can respond accordingly (for example, by gathering data from other services/systems). In some implementations, the query management service 605 may transmit pre-processing information (such as an estimated response time or a request for more information) back to the communication service 615 before handling/processing the query. For example, if the intent of the query corresponds to a workflow interaction mode, the query management service 605 may cause a consolidated dialog form (such as the consolidated dialog form 315 described with reference to FIG. 3) to be displayed in the source messaging channel (e.g., Slack channel).

In some examples, the query management service 605 may recursively contact other Slack bots for dependent/related queries. For example, if the query management service 605 asks a first Slack bot for additional information, the first Slack bot may ask another Slack bot for other details, which may contact another Slack bot (as instructed by the query management service 605) to obtain the desired results. This process can be used if, for example, another Slack bot can be reached by an intermediate Slack bot (but not by the query management service 605).

The query management service 605 may establish respective socket connections with a work item tracking system 630 (i.e., Salesforce GUS), a document collaboration service (i.e., Salesforce Quip), the NLP service 625 (i.e., Amazon Lex) and other network security services 620 spread across multiple cloud substrates. The query management service 605 may also obtain service-related information via a service API. For example, the query management service 605 may retrieve details on a particular service instance (equivalently referred to herein as a Falcon instance), such as a functional domain name or a service type associated with a service instance. Additionally, or alternatively, the query management service 605 may retrieve information from a monitoring/logging service (i.e., Argus) that tracks metrics for network security service pipeline runs. In some examples, the query management service 605 may retrieve on-call details from the document collaboration service and notify the on-call engineer, as indicated by an on-call schedule.

The query management service 605 can be used for troubleshooting and other situations where users are experiencing errors. Additionally, or alternatively, the query management service 605 can help resolve queries related to security pipeline runs, connectivity checks, pull request review approval, error case resolution, general questions, mitigations, status information, building network security policy, etc. If, for example, a query includes a request for pull request review approval or a pipeline run, the query management service 605 may post a consolidated dialog form into the appropriate Slack channel (as shown in the example of FIG. 3). The query management service 605 may also support on-demand alerts for service owners based on network security service queries.

In some implementations, the query management service 605 may access an in-memory cache (such as the in-memory cache 265 described with reference to FIG. 2) that is synchronized with a distributed cache cluster (i.e., Redis), thereby ensuring high cache availability, scalability, and resilience. Internally, the query management service 605 may run as a single process with 3 threads operating in parallel. One thread may handle periodic data and configuration synchronization, one thread may handle network security posture data synchronization, and one thread may be dedicated to handling cache operations. The query management service 605 may use these parallel threads to formulate appropriate responses to queries.

The query management service 605 may support automated NLP score tuning based on query resolution answer history and automatic scaling based on the number of incoming queries per minute. As more queries arrive, the query management service 605 can auto-scale and load balance incoming queries to provide timely responses to end users. As described with reference to FIG. 4, the query management service 605 may generate detailed reports of automated query processing statistics. These dynamic dashboards (such as the dashboard interface 400 described with reference to FIG. 4) can be customized based on user preferences, feedback, user type, etc. Thus, different administrative users may be presented with different dashboards. In some examples, the query management service 605 may enable users to customize/edit dashboard features as needed.

Figure 7:
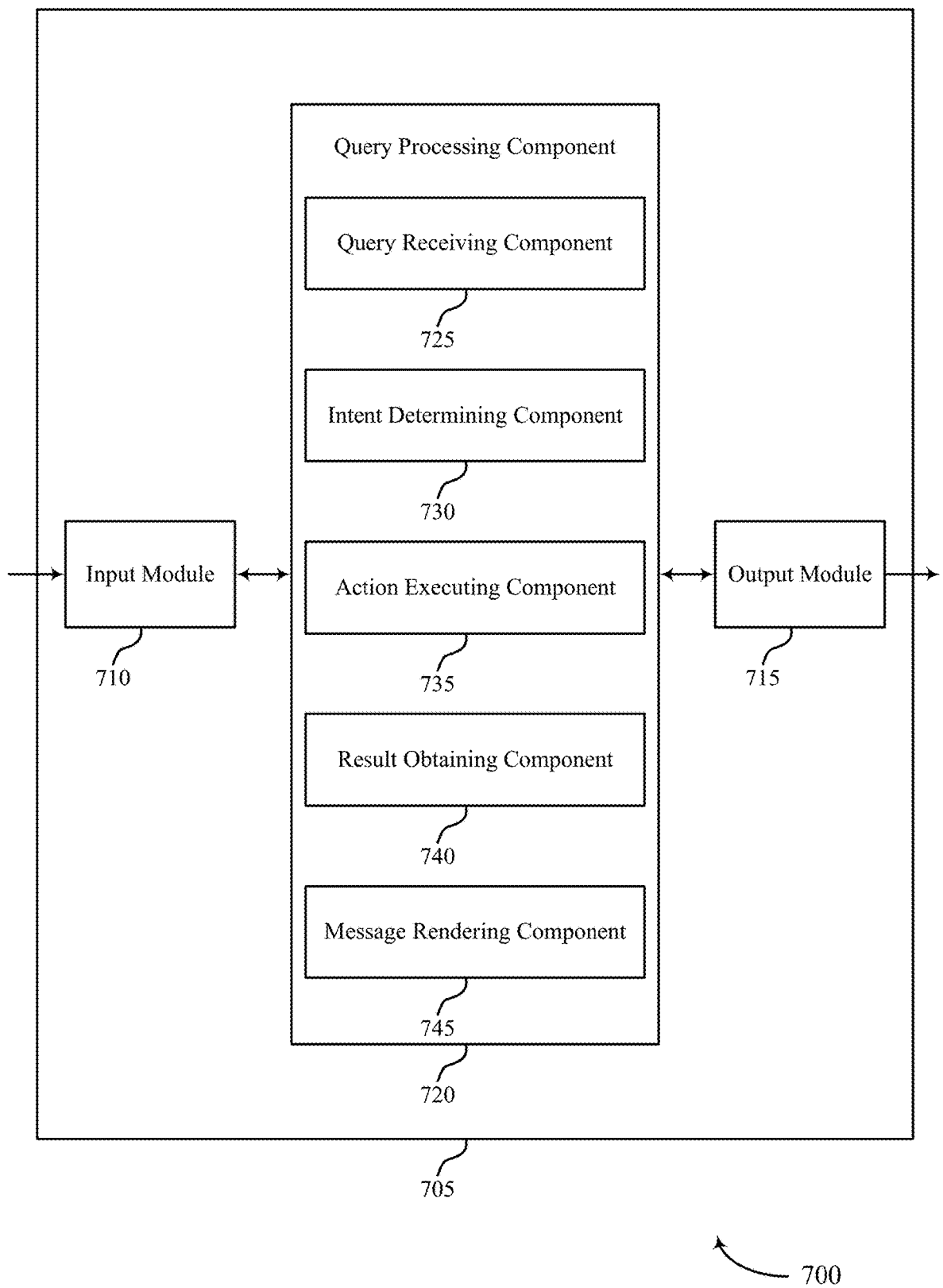
FIG. 7 illustrates a block diagram of an apparatus that supports techniques for processing queries related to network security in accordance with aspects of the present disclosure.

FIG. 7 illustrates a block diagram 700 of a device 705 that supports techniques for processing queries related to network security in accordance with aspects of the present disclosure. The device 705 may include an input module 710, an output module 715, and a query processing component 720. The device 705 may also include a processor. Each of these components may be in communication with one another (e.g., via one or more buses).

The input module 710 may manage input signals for the device 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the device 705 for processing. For example, the input module 710 may transmit input signals to the query processing component 720 to support techniques for processing queries related to network security. In some cases, the input module 710 may be a component of an input/output (I/O) controller 910, as described with reference to FIG. 9.

The output module 715 may manage output signals for the device 705. For example, the output module 715 may receive signals from other components of the device 705, such as the query processing component 720, and may transmit these signals to other components or devices. In some examples, the output module 715 may transmit output signals for display in a user interface, for storage in a database or data store, for further processing at a server or server cluster, or for any other processes at any number of devices or systems. In some cases, the output module 715 may be a component of an I/O controller 910, as described with reference to FIG. 9.

For example, the query processing component 720 may include a query receiving component 725, an intent determining component 730, an action executing component 735, a result obtaining component 740, a message rendering component 745, or any combination thereof. In some examples, the query processing component 720, or various components thereof, may be configured to perform various operations (e.g., receiving, monitoring, transmitting) using or otherwise in cooperation with the input module 710, the output module 715, or both. For example, the query processing component 720 may receive information from the input module 710, send information to the output module 715, or be integrated in combination with the input module 710, the output module 715, or both to receive information, transmit information, or perform various other operations as described herein.

The query processing component 720 may support data processing and troubleshooting at a query management service in accordance with examples disclosed herein. The query receiving component 725 may be configured to support receiving, via a proxy between the query management service and a communication service, an indication of a query from a user of the communication service. The intent determining component 730 may be configured to support determining an intent of the query based on using a third-party NLP model (such as the NLP service 530 described with reference to FIG. 5) to analyze the query from the user. The action executing component 735 may be configured to support executing, within a distributed computing environment that includes the query management service and a set of multi-substrate network security services, a sequence of actions that correspond to the intent of the query. The result obtaining component 740 may be configured to support obtaining one or more query results based on executing the sequence of actions within the distributed computing environment. The message rendering component 745 may be configured to support transmitting an indication of the one or more query results to the communication service connected to the query management service via the proxy, where the one or more query results are rendered according to feedback information from the user.

Figure 8:
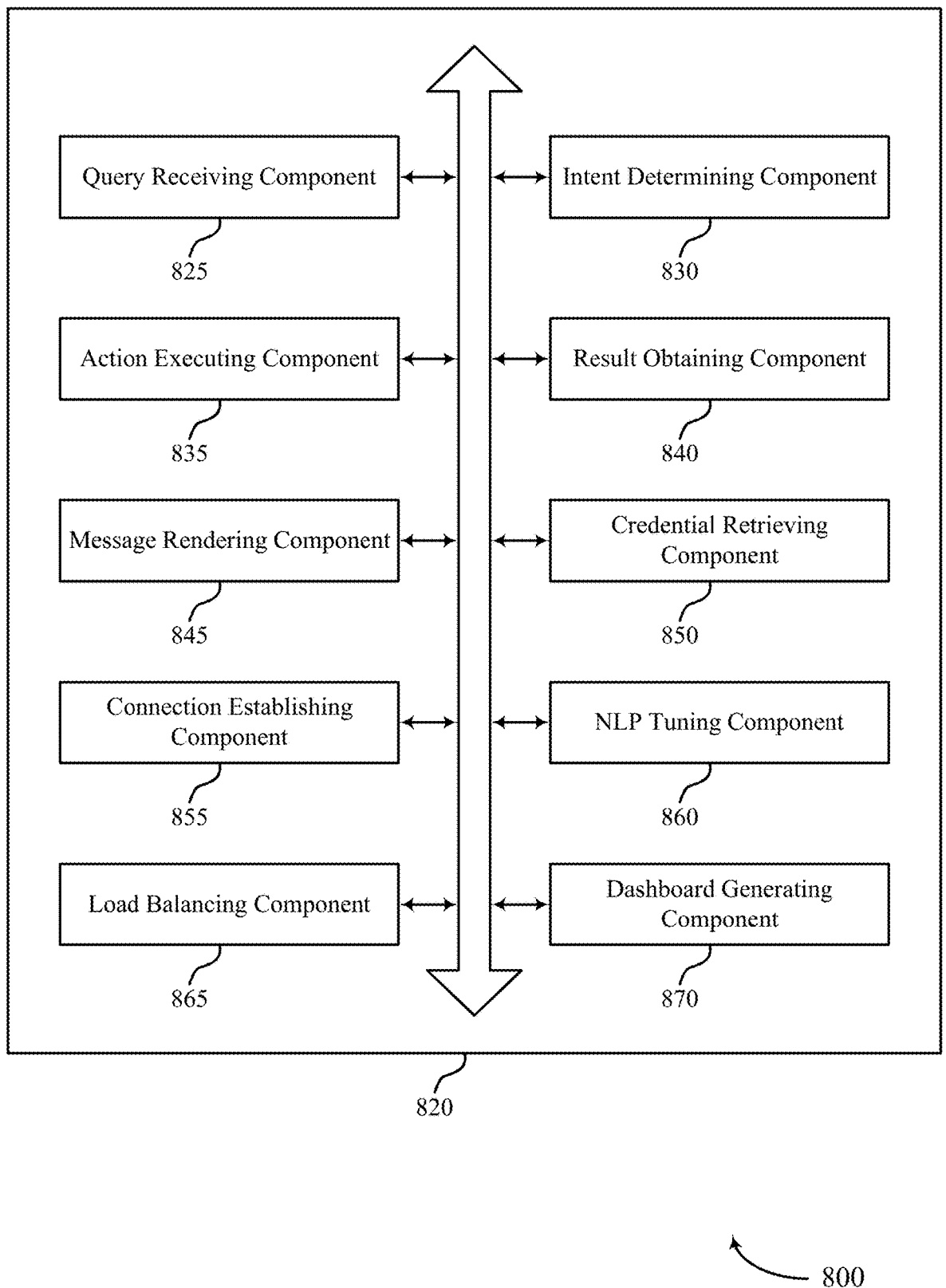
FIG. 8 illustrates a block diagram of a query processing component that supports techniques for processing queries related to network security in accordance with aspects of the present disclosure.

FIG. 8 illustrates a block diagram 800 of a query processing component 820 that supports techniques for processing queries related to network security in accordance with aspects of the present disclosure. The query processing component 820 may be an example of aspects of a query processing component or a query processing component 720, or both, as described herein. The query processing component 820, or various components thereof, may be an example of means for performing various aspects of techniques for processing queries related to network security as described herein. For example, the query processing component 820 may include a query receiving component 825, an intent determining component 830, an action executing component 835, a result obtaining component 840, a message rendering component 845, a credential retrieving component 850, a connection establishing component 855, an NLP tuning component 860, a load balancing component 865, a dashboard generating component 870, or any combination thereof. Each of these components may communicate, directly or indirectly, with one another (e.g., via one or more buses).

The query processing component 820 may support data processing and troubleshooting at a query management service in accordance with examples disclosed herein. The query receiving component 825 may be configured to support receiving, via a proxy between the query management service and a communication service, an indication of a query from a user of the communication service. The intent determining component 830 may be configured to support determining an intent of the query based on using a third-party NLP model to analyze the query from the user. The action executing component 835 may be configured to support executing, within a distributed computing environment that includes the query management service and a set of multi-substrate network security services, a sequence of actions that correspond to the intent of the query. The result obtaining component 840 may be configured to support obtaining one or more query results based on executing the sequence of actions within the distributed computing environment. The message rendering component 845 may be configured to support transmitting an indication of the one or more query results to the communication service connected to the query management service via the proxy, where the one or more query results are rendered according to feedback information from the user.

In some examples, to support executing the sequence of actions, the credential retrieving component 850 may be configured to support retrieving a set of credentials from a secure data repository in the distributed computing environment. In some examples, to support executing the sequence of actions, the result obtaining component 840 may be configured to support extracting the one or more query results based on using the set of credentials from the secure data repository to access the set of multi-substrate network security services via one or more APIs.

In some examples, to support executing the sequence of actions, the action executing component 835 may be configured to support transmitting pre-processing information to the communication service before processing the query from the user, the pre-processing information including an initial response to the query, an indication that the query management service is actively processing the query, an indication of an expected query response time, a request for additional information from the user, or a combination thereof.

In some examples, to support obtaining the one or more query results, the result obtaining component 840 may be configured to support obtaining, via at least one service API, information that pertains to one or more network security service instances or functional domains of the distributed computing environment spread across multiple substrates.

In some examples, the intent of the query is checking a connectivity status of a network security service, confirming whether a network security service is accessible from a network within the distributed computing environment, connectivity troubleshooting, debugging network security-related problems, running a security pipeline operation, obtaining security deployment information, acquiring security service details, determining a status of a network security posture, building network policy, requesting approval of a review pull request, opening or closing a work item, resolving an error, determining a status of an issue, or a combination thereof.

In some examples, to support executing the sequence of actions, the action executing component 835 may be configured to support causing a consolidated dialog form to be rendered within a user interface of the communication service, where at least a portion of the consolidated dialog form is pre-populated with information extracted from the query.

In some examples, to support executing the sequence of actions, the action executing component 835 may be configured to support recursively resolving at least a portion of the query based on establishing a connection with an external application that is integrated with the communication service.

In some examples, to support obtaining the one or more query results, the result obtaining component 840 may be configured to support retrieving the one or more query results from a monitoring service that stores metrics from multiple data sources in the distributed computing environment, where the one or more query results include metrics associated with a network security service pipeline run.

In some examples, to support executing the sequence of actions, the action executing component 835 may be configured to support transmitting an alert to one or more service owners in response to determining that the query pertains to network security service operations.

In some examples, a first thread of the query management service controls periodic data synchronization, a second thread of the query management service controls security posture synchronization, and a third thread of the query management service controls cache handling operations. In some examples, the first thread, the second thread, and the third thread all operate in parallel.

In some examples, to support obtaining the one or more query results, the result obtaining component 840 may be configured to support retrieving the one or more query results from an in-memory cache that is synchronized with a third-party distributed cache.

In some examples, to support executing the sequence of actions, the action executing component 835 may be configured to support retrieving, from a third-party document collaboration service, contact information for an on-call user that is responsible for handling queries pertaining to network security services. In some examples, to support executing the sequence of actions, the action executing component 835 may be configured to support transmitting an indication of the query to the on-call user.

In some examples, the connection establishing component 855 may be configured to support establishing a bidirectional socket connection with at least one of the communication service, a third-party messaging application, a third-party work item tracking system, a third-party document collaboration service, or a third-party NLP application via the proxy, where the one or more query results are obtained via the bidirectional socket connection.

In some examples, the NLP tuning component 860 may be configured to support performing an automated NLP tuning process to determine a score for the one or more query results using historic query resolution feedback from the user of the communication service. In some examples, the message rendering component 845 may be configured to support causing the one or more query results to be rendered according to a result of the automated NLP tuning process.

In some examples, the load balancing component 865 may be configured to support performing a combination of automatic scaling and load balancing operations to reduce a query response time of the query management service if a number of queries received per minute satisfies a threshold.

In some examples, the dashboard generating component 870 may be configured to support generating a dynamic dashboard that includes statistics associated with queries received and processed by the query management service within a time interval, where at least one user interface element of the dynamic dashboard is customized by the user. In some examples, the set of multi-substrate network security services are distributed across multiple third-party hosting environments.

In some examples, the query management service supports a workflow-based interaction mode and a conversation-based interaction mode, the workflow-based interaction mode providing user interface forms that are customized based on historic usage information associated with the user and a type of the user, the conversation-based interaction mode providing conversational questions and responses that are customized based on the historic usage information and the type of the user.

Figure 9:
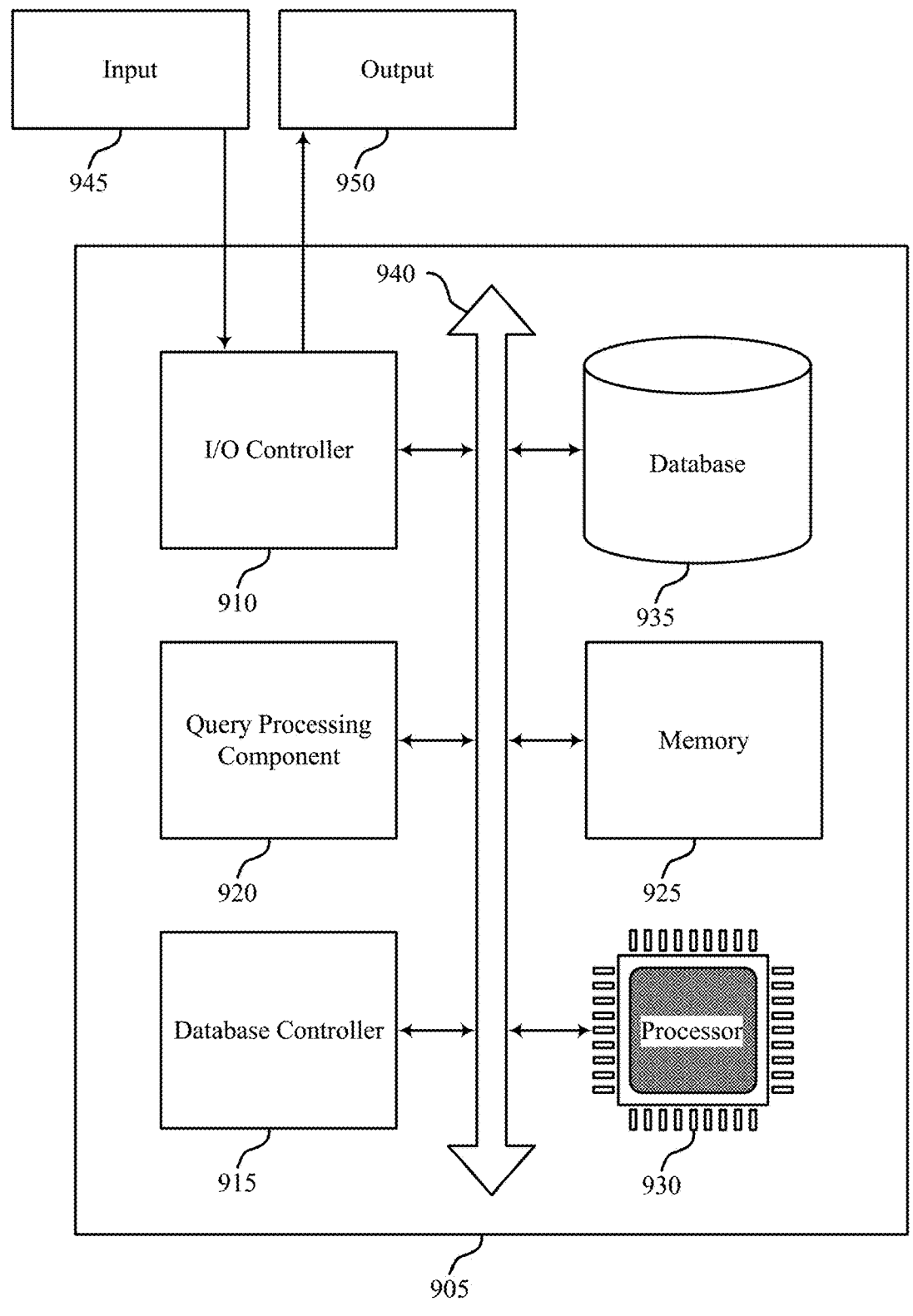
FIG. 9 illustrates a diagram of a system including a device that supports techniques for processing queries related to network security in accordance with aspects of the present disclosure.

FIG. 9 illustrates a diagram of a system 900 including a device 905 that supports techniques for processing queries related to network security in accordance with aspects of the present disclosure. The device 905 may be an example of or include the components of a device 705 as described herein. The device 905 may include components for bidirectional data communications including components for transmitting and receiving communications, such as a query processing component 920, an I/O controller 910, a database controller 915, a memory 925, a processor 930, and a database 935. These components may be in electronic communication or otherwise coupled (e.g., operatively, communicatively, functionally, electronically, electrically) via one or more buses (e.g., a bus 940).

The I/O controller 910 may manage input signals 945 and output signals 950 for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. In other cases, the I/O controller 910 may represent or interact with a modem, a keyboard, a mouse, a touchscreen, or a similar device. In some cases, the I/O controller 910 may be implemented as part of a processor 930. In some examples, a user may interact with the device 905 via the I/O controller 910 or via hardware components controlled by the I/O controller 910.

The database controller 915 may manage data storage and processing in a database 935. In some cases, a user may interact with the database controller 915. In other cases, the database controller 915 may operate automatically without user interaction. The database 935 may be an example of a single database, a distributed database, multiple distributed databases, a data store, a data lake, or an emergency backup database.

Memory 925 may include random-access memory (RAM) and read-only memory (ROM). The memory 925 may store computer-readable, computer-executable software including instructions that, when executed, cause the processor 930 to perform various functions described herein. In some cases, the memory 925 may contain, among other things, a basic I/O system (BIOS) which may control basic hardware or software operation such as the interaction with peripheral components or devices.

The processor 930 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory

925 to perform various functions (e.g., functions or tasks supporting techniques for processing queries related to network security).

The query processing component 920 may support data processing and troubleshooting at a query management service in accordance with examples disclosed herein. For example, the query processing component 920 may be configured to support receiving, via a proxy between the query management service and a communication service, an indication of a query from a user of the communication service. The query processing component 920 may be configured to support determining an intent of the query based on using a third-party NLP model to analyze the query from the user. The query processing component 920 may be configured to support executing, within a distributed computing environment that includes the query management service and a set of multi-substrate network security services, a sequence of actions that correspond to the intent of the query. The query processing component 920 may be configured to support obtaining one or more query results based on executing the sequence of actions within the distributed computing environment. The query processing component 920 may be configured to support transmitting an indication of the one or more query results to the communication service connected to the query management service via the proxy, where the one or more query results are rendered according to feedback information from the user.

By including or configuring the query processing component 920 in accordance with examples as described herein, the device 905 may support techniques for automatically interpreting/handling network security related-queries from users of a communication service, thereby reducing the number of network security-related queries that are manually resolved by system administrators or network security engineers. Furthermore, using a query management service to autonomously handle requests related to network security may enable end users to obtain query results, troubleshoot connectivity issues, and/or submit service requests in real-time (i.e., without waiting for another user to manually resolve each query). The query management service described herein may also customize query results according to feedback provided by end users, resulting in higher user satisfaction and improved user experience.

Figure 10:
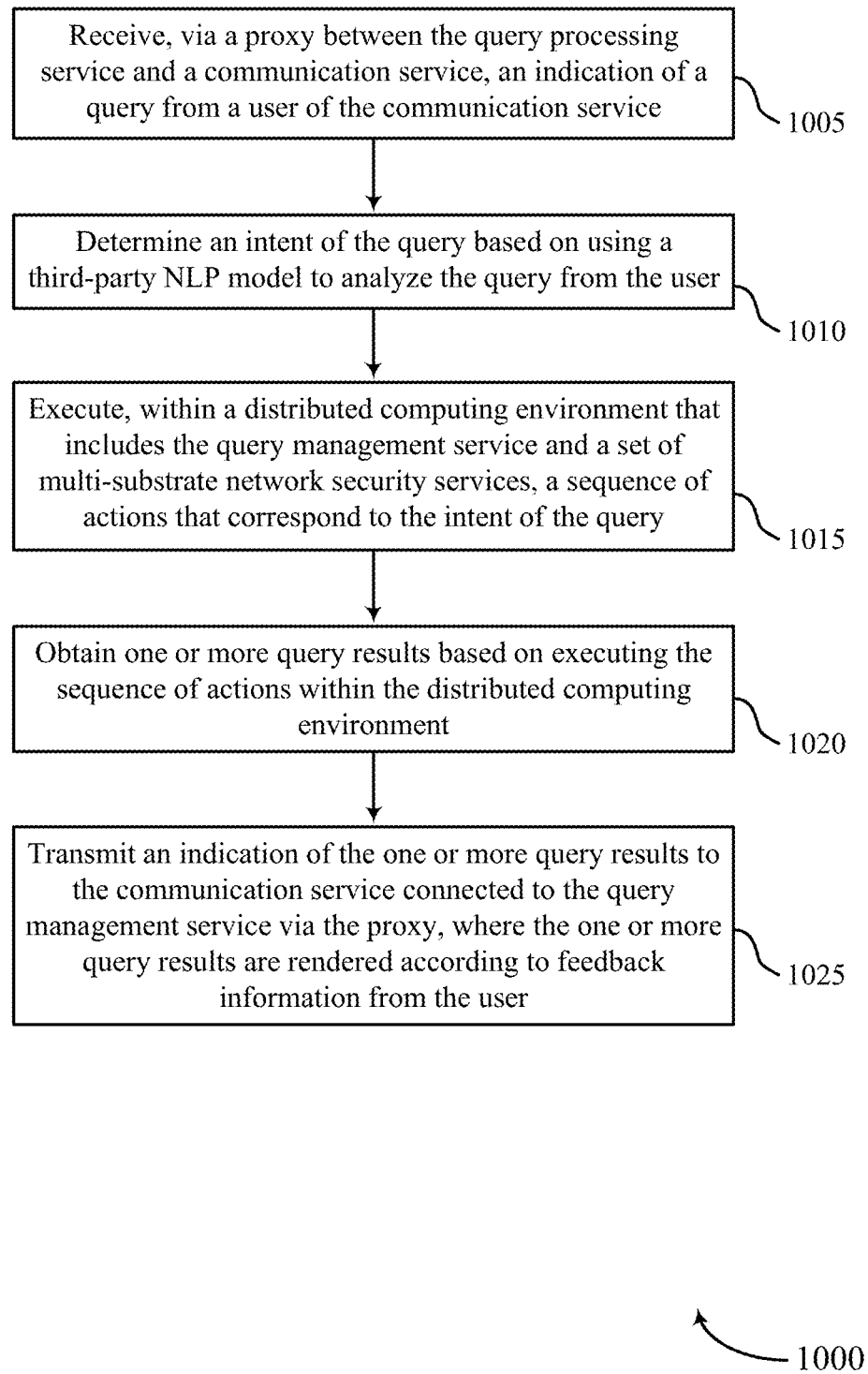
FIGS. 10 and 11 illustrate flowcharts showing methods that support techniques for processing queries related to network security in accordance with aspects of the present disclosure.

FIG. 10 illustrates a flowchart showing a method 1000 that supports techniques for processing queries related to network security in accordance with aspects of the present disclosure. The operations of the method 1000 may be implemented by a query management service or components thereof. For example, the operations of the method 1000 may be performed by the query management service 245, as described with reference to FIG. 2. In some examples, the query management service may execute a set of instructions to control functional elements of the query management service to perform the described functions. Additionally, or alternatively, the query management service may perform aspects of the described functions using special-purpose hardware.

At 1005, the query management service may receive, via a proxy between the query management service and a communication service, an indication of a query from a user of the communication service. The operations of 1005 may be performed in accordance with examples disclosed herein. In some examples, aspects of the operations of 1005 may be performed by a query receiving component 825, as described with reference to FIG. 8.

At 1010, the query management service may determine an intent of the query based on using a third-party NLP model and customized logic to analyze the query from the user. The operations of 1010 may be performed in accordance with examples disclosed herein. In some examples, aspects of the operations of 1010 may be performed by an intent determining component 830, as described with reference to FIG. 8.

At 1015, the query management service may execute, within a distributed computing environment that includes the query management service and a set of multi-substrate network security services, a sequence of actions that correspond to the intent of the query. The operations of 1015 may be performed in accordance with examples disclosed herein. In some examples, aspects of the operations of 1015 may be performed by an action executing component 835, as described with reference to FIG. 8.

At 1020, the query management service may obtain one or more query results based on executing the sequence of actions within the distributed computing environment. The operations of 1020 may be performed in accordance with examples disclosed herein. In some examples, aspects of the operations of 1020 may be performed by a result obtaining component 840, as described with reference to FIG. 8.

At 1025, the query management service may transmit an indication of the one or more query results to the communication service connected to the query management service via the proxy, where the one or more query results are rendered according to feedback information from the user. The operations of 1025 may be performed in accordance with examples disclosed herein. In some examples, aspects of the operations of 1025 may be performed by a message rendering component 845, as described with reference to FIG. 8.

Figure 11:
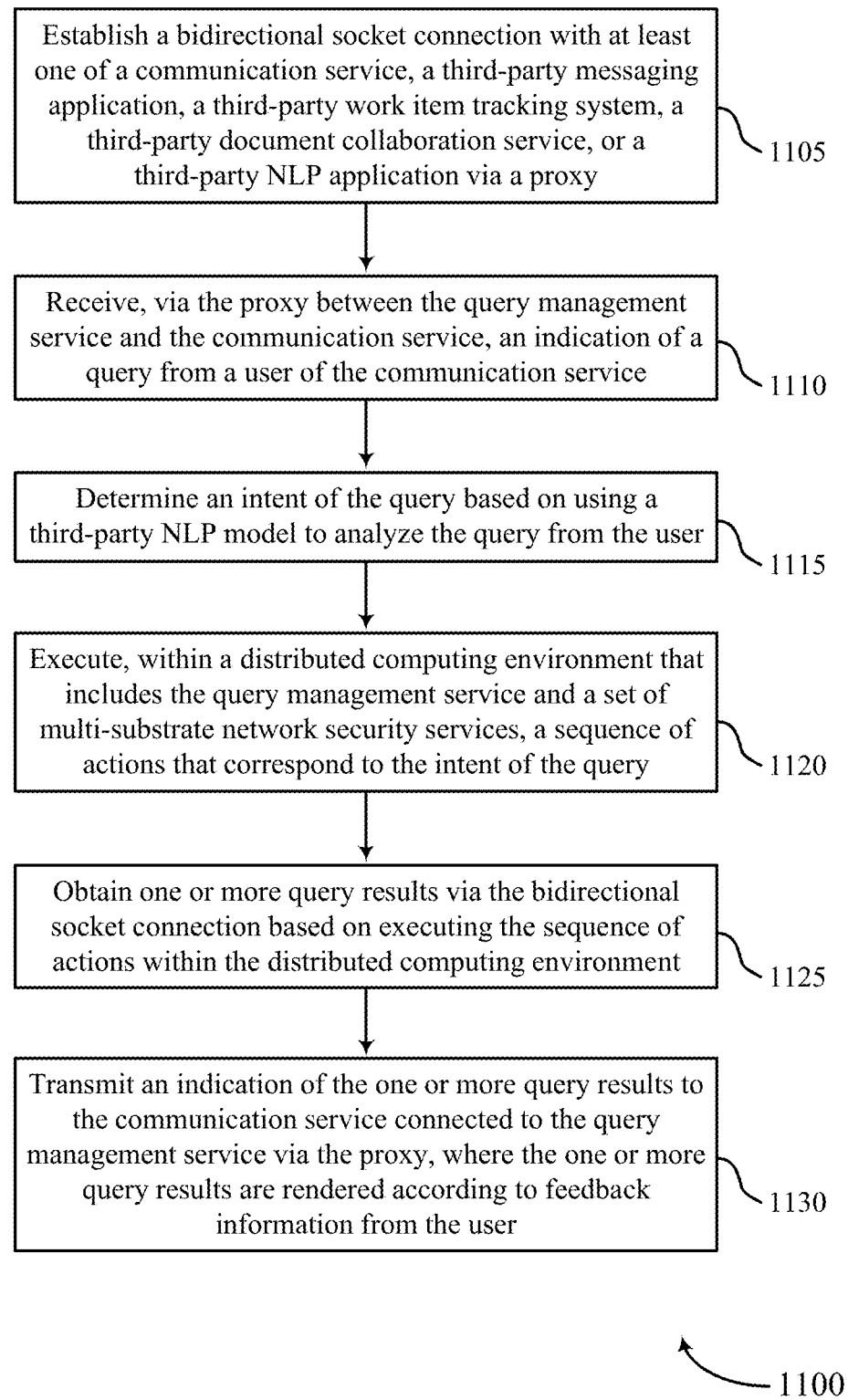

FIG. 11 illustrates a flowchart showing a method 1100 that supports techniques for processing queries related to network security in accordance with aspects of the present disclosure. The operations of the method 1100 may be implemented by a query management service or components thereof. For example, the operations of the method 1100 may be performed by the query management service 510, as described with reference to FIG. 5. In some examples, the query management service may execute a set of instructions to control functional elements of the query management service to perform the described functions. Additionally, or alternatively, the query management service may perform aspects of the described functions using special-purpose hardware.

At 1105, the query management service may establish a bidirectional socket connection with at least one of a communication service, a third-party messaging application, a third-party work item tracking system, a third-party document collaboration service, or a third-party NLP application via a proxy. The operations of 1105 may be performed in accordance with examples disclosed herein. In some examples, aspects of the operations of 1105 may be performed by a connection establishing component 855, as described with reference to FIG. 8.

At 1110, the query management service may receive, via the proxy between the query management service and the communication service, an indication of a query from a user of the communication service. The operations of 1110 may be performed in accordance with examples disclosed herein. In some examples, aspects of the operations of 1110 may be performed by a query receiving component 825, as described with reference to FIG. 8.

At 1115, the query management service may determine an intent of the query based on using a third-party NLP model and customized logic to analyze the query from the user. The operations of 1115 may be performed in accordance with examples disclosed herein. In some examples, aspects of the operations of 1115 may be performed by an intent determining component 830, as described with reference to FIG. 8.

At 1120, the query management service may execute, within a distributed computing environment that includes the query management service and a set of multi-substrate network security services, a sequence of actions that correspond to the intent of the query. The operations of 1120 may be performed in accordance with examples disclosed herein. In some examples, aspects of the operations of 1120 may be performed by an action executing component 835, as described with reference to FIG. 8.

At 1125, the query management service may obtain one or more query results via the bidirectional socket connection based on executing the sequence of actions within the distributed computing environment. The operations of 1125 may be performed in accordance with examples disclosed herein. In some examples, aspects of the operations of 1125 may be performed by a result obtaining component 840, as described with reference to FIG. 8.

At 1130, the query management service may transmit an indication of the one or more query results to the communication service connected to the query management service via the proxy, where the one or more query results are rendered according to feedback information from the user. The operations of 1130 may be performed in accordance with examples disclosed herein. In some examples, aspects of the operations of 1130 may be performed by a message rendering component 845, as described with reference to FIG. 8.

A method for data processing and troubleshooting at a query management service is described. The method may include receiving, via a proxy between the query management service and a communication service, an indication of a query from a user of the communication service. The method may further include determining an intent of the query based on using a third-party NLP model to analyze the query from the user. The method may further include executing, within a distributed computing environment that includes the query management service and a set of multi-substrate network security services, a sequence of actions that correspond to the intent of the query. The method may further include obtaining one or more query results based on executing the sequence of actions within the distributed computing environment. The method may further include transmitting an indication of the one or more query results to the communication service connected to the query management service via the proxy, where the one or more query results are rendered according to feedback information from the user.

A apparatus for data processing and troubleshooting at a query management service is described. The apparatus may include a processor, memory coupled with the processor, and instructions stored in the memory. The instructions may be executable by the processor to cause the apparatus to receive, via a proxy between the query management service and a communication service, an indication of a query from a user of the communication service. The instructions may be further executable by the processor to cause the apparatus to determine an intent of the query based on using a third-party NLP model and customized logic to analyze the query from the user. The instructions may be further executable by the processor to cause the apparatus to execute, within a distributed computing environment that includes the query management service and a set of multi-substrate network security services, a sequence of actions that correspond to the intent of the query. The instructions may be further executable by the processor to cause the apparatus to obtain one or more query results based on executing the sequence of actions within the distributed computing environment. The instructions may be further executable by the processor to cause the apparatus to transmit an indication of the one or more query results to the communication service connected to the query management service via the proxy, where the one or more query results are rendered according to feedback information from the user.

Another apparatus for data processing and troubleshooting at a query management service is described. The apparatus may include means for receiving, via a proxy between the query management service and a communication service, an indication of a query from a user of the communication service. The apparatus may further include means for determining an intent of the query based on using a third-party NLP model and customized logic to analyze the query from the user. The apparatus may further include means for executing, within a distributed computing environment that includes the query management service and a set of multi-substrate network security services, a sequence of actions that correspond to the intent of the query. The apparatus may further include means for obtaining one or more query results based on executing the sequence of actions within the distributed computing environment. The apparatus may further include means for transmitting an indication of the one or more query results to the communication service connected to the query management service via the proxy, where the one or more query results are rendered according to feedback information from the user.

A non-transitory computer-readable medium storing code for data processing and troubleshooting at a query management service is described. The code may include instructions executable by a processor to receive, via a proxy between the query management service and a communication service, an indication of a query from a user of the communication service. The instructions may be further executable by the processor to determine an intent of the query based on using a third-party NLP model and customized logic to analyze the query from the user. The instructions may be further executable by the processor to execute, within a distributed computing environment that includes the query management service and a set of multi-substrate network security services, a sequence of actions that correspond to the intent of the query. The instructions may be further executable by the processor to obtain one or more query results based on executing the sequence of actions within the distributed computing environment. The instructions may be further executable by the processor to transmit an indication of the one or more query results to the communication service connected to the query management service via the proxy, where the one or more query results are rendered according to feedback information from the user.

In some examples of the methods, apparatuses, and non-transitory computer-readable media described herein, executing the sequence of actions may include operations, features, means, or instructions for: retrieving a set of credentials from a secure data repository in the distributed computing environment; and extracting the one or more query results based on using the set of credentials from the secure data repository to access the set of multi-substrate network security services via one or more APIs.

In some examples of the methods, apparatuses, and non-transitory computer-readable media described herein, executing the sequence of actions may include operations, features, means, or instructions for transmitting pre-processing information to the communication service before processing the query from the user, the pre-processing information including an initial response to the query, an indication that the query management service is actively processing the query, an indication of an expected query response time, a request for additional information from the user, or a combination thereof.

In some examples of the methods, apparatuses, and non-transitory computer-readable media described herein, obtaining the one or more query results may include operations, features, means, or instructions for obtaining, via at least one service API, information that pertains to one or more network security service instances or functional domains of the distributed computing environment.

In some examples of the methods, apparatuses, and non-transitory computer-readable media described herein, the intent of the query may include checking a connectivity status of a network security service, confirming whether a network security service is accessible from a network within the distributed computing environment, connectivity troubleshooting, debugging network security-related problems, running a security pipeline operation, obtaining security deployment information, acquiring security service details, determining a status of a network security posture, requesting approval of a pull request, opening or closing a work item, resolving an error, determining a status of an issue, or a combination thereof.

In some examples of the methods, apparatuses, and non-transitory computer-readable media described herein, executing the sequence of actions may include operations, features, means, or instructions for causing a consolidated dialog form to be rendered within a user interface of the communication service, where at least a portion of the consolidated dialog form is pre-populated with information extracted from the query.

In some examples of the methods, apparatuses, and non-transitory computer-readable media described herein, executing the sequence of actions may include operations, features, means, or instructions for recursively resolving at least a portion of the query based on establishing a connection with an external application that is integrated with the communication service.

In some examples of the methods, apparatuses, and non-transitory computer-readable media described herein, obtaining the one or more query results may include operations, features, means, or instructions for retrieving the one or more query results from a monitoring service that stores metrics from multiple data sources in the distributed computing environment, where the one or more query results include metrics associated with a network security service pipeline run.

In some examples of the methods, apparatuses, and non-transitory computer-readable media described herein, executing the sequence of actions may include operations, features, means, or instructions for transmitting an alert to one or more service owners in response to determining that the query pertains to network security service operations.

In some examples of the methods, apparatuses, and non-transitory computer-readable media described herein, a first thread of the query management service controls periodic data synchronization, a second thread of the query management service controls security posture synchronization, and a third thread of the query management service controls cache handling operations and the first thread, the second thread, and the third thread all operate in parallel.

In some examples of the methods, apparatuses, and non-transitory computer-readable media described herein, obtaining the one or more query results may include operations, features, means, or instructions for retrieving the one or more query results from an in-memory cache that is synchronized with a third-party distributed cache.

In some examples of the methods, apparatuses, and non-transitory computer-readable media described herein, executing the sequence of actions may include operations, features, means, or instructions for: retrieving, from a third-party document collaboration service, contact information for an on-call user that is responsible for handling queries pertaining to network security services; and transmitting an indication of the query to the on-call user.

Some examples of the methods, apparatuses, and non-transitory computer-readable media described herein may further include operations, features, means, or instructions for establishing a bidirectional socket connection with at least one of the communication service, a third-party messaging application, a third-party work item tracking system, a third-party document collaboration service, or a third-party NLP application via the proxy, where the one or more query results are obtained via the bidirectional socket connection.

Some examples of the methods, apparatuses, and non-transitory computer-readable media described herein may further include operations, features, means, or instructions for performing an automated NLP tuning process to determine a score for the one or more query results using historic query resolution feedback from the user of the communication service and causing the one or more query results to be rendered according to a result of the automated NLP tuning process.

Some examples of the methods, apparatuses, and non-transitory computer-readable media described herein may further include operations, features, means, or instructions for performing a combination of automatic scaling and load balancing operations to reduce a query response time of the query management service if a number of queries received per minute satisfies a threshold.

Some examples of the methods, apparatuses, and non-transitory computer-readable media described herein may further include operations, features, means, or instructions for generating a dynamic dashboard that includes statistics associated with queries received and processed by the query management service within a time interval, where at least one user interface element of the dynamic dashboard is customized by the user.

In some examples of the methods, apparatuses, and non-transitory computer-readable media described herein, the set of multi-substrate network security services may be distributed across multiple third-party hosting environments.

In some examples of the methods, apparatuses, and non-transitory computer-readable media described herein, the query management service supports a workflow-based interaction mode and a conversation-based interaction mode, the workflow-based interaction mode providing user interface forms that are customized based on historic usage information associated with the user and a type of the user, the conversation-based interaction mode providing conversational questions and responses that are customized based on the historic usage information and the type of the user.

The following provides an overview of aspects of the present disclosure:

Aspect 1: A method for data processing and troubleshooting at a query management service, comprising: receiving, via a proxy between the query management service and a communication service, an indication of a query from a user of the communication service: determining an intent of the query based at least in part on using a third-party NLP model and customized logic to analyze the query from the user: executing, within a distributed computing environment that includes the query management service and a set of multi-substrate network security services, a sequence of actions that correspond to the intent of the query: obtaining one or more query results based at least in part on executing the sequence of actions within the distributed computing environment; and transmitting an indication of the one or more query results to the communication service connected to the query management service via the proxy, wherein the one or more query results are rendered according to feedback information from the user.

Aspect 2: The method of aspect 1, wherein executing the sequence of actions comprises: retrieving a set of credentials from a secure data repository in the distributed computing environment; and extracting the one or more query results based at least in part on using the set of credentials from the secure data repository to access the set of multi-substrate network security services via one or more APIs.

Aspect 3: The method of any of aspects 1 through 2, wherein executing the sequence of actions comprises: transmitting pre-processing information to the communication service before processing the query from the user, the pre-processing information comprising an initial response to the query, an indication that the query management service is actively processing the query, an indication of an expected query response time, a request for additional information from the user, or a combination thereof.

Aspect 4: The method of any of aspects 1 through 3, wherein obtaining the one or more query results comprises: obtaining, via at least one service API, information that pertains to one or more network security service instances or functional domains of the distributed computing environment spread across multiple substrates.

Aspect 5: The method of any of aspects 1 through 4, wherein the intent of the query is checking a connectivity status of a network security service, confirming whether a network security service is accessible from a network within the distributed computing environment, connectivity troubleshooting, debugging network security-related problems, running a security pipeline operation, obtaining security deployment information, acquiring security service details, determining a status of a network security posture, requesting approval of a review pull request, opening or closing a work item, resolving an error, determining a status of an issue, building network policies, or a combination thereof.

Aspect 6: The method of any of aspects 1 through 5, wherein executing the sequence of actions comprises: causing a consolidated dialog form to be rendered within a user interface of the communication service, wherein at least a portion of the consolidated dialog form is pre-populated with information extracted from the query.

Aspect 7: The method of any of aspects 1 through 6, wherein executing the sequence of actions comprises: recursively resolving at least a portion of the query based at least in part on establishing a connection with an external application that is integrated with the communication service.

Aspect 8: The method of any of aspects 1 through 7, wherein obtaining the one or more query results comprises: retrieving the one or more query results from a monitoring service that stores metrics from a plurality of data sources in the distributed computing environment, wherein the one or more query results comprise metrics associated with network security operations.

Aspect 9: The method of any of aspects 1 through 8, wherein executing the sequence of actions comprises: transmitting an alert to one or more service owners in response to determining that the query pertains to network security service operations.

Aspect 10: The method of any of aspects 1 through 9, wherein a first thread of the query management service controls periodic data synchronization, a second thread of the query management service controls security posture synchronization, and a third thread of the query management service controls cache handling operations, and the first thread, the second thread, and the third thread all operate in parallel.

Aspect 11: The method of any of aspects 1 through 10, wherein obtaining the one or more query results comprises: retrieving the one or more query results from an in-memory cache that is synchronized with a third-party distributed cache.

Aspect 12: The method of any of aspects 1 through 11, wherein executing the sequence of actions comprises: retrieving, from a third-party document collaboration service, contact information for an on-call user that is responsible for handling queries pertaining to network security services; and transmitting an indication of the query to the on-call user.

Aspect 13: The method of any of aspects 1 through 12, further comprising: establishing a bidirectional socket connection with at least one of the communication service, a third-party messaging application, a third-party work item tracking system, a third-party document collaboration service, or a third-party NLP application via the proxy, wherein the one or more query results are obtained via the bidirectional socket connection.

Aspect 14: The method of any of aspects 1 through 13, further comprising: performing an automated NLP tuning process to determine a score for the one or more query results using historic query resolution feedback from the user of the communication service; and causing the one or more query results to be rendered according to a result of the automated NLP tuning process.

Aspect 15: The method of any of aspects 1 through 14, further comprising: performing a combination of automatic scaling and load balancing operations to reduce a query response time of the query management service if a number of queries received per minute satisfies a threshold.

Aspect 16: The method of any of aspects 1 through 15, further comprising: generating a dynamic dashboard that includes statistics associated with queries received and processed by the query management service within a time interval, wherein at least one user interface element of the dynamic dashboard is customized by the user and based on user type.

Aspect 17: The method of any of aspects 1 through 16, wherein the set of multi-substrate network security services are distributed across a plurality of third-party hosting environments.

Aspect 18: The method of any of aspects 1 through 17, wherein the query management service supports a workflow-based interaction mode and a conversation-based interaction mode, the workflow-based interaction mode providing user interface forms that are customized based at least in part on historic usage information associated with the user and a type of the user, the conversation-based interaction mode providing conversational questions and responses that are customized based at least in part on the historic usage information and the type of the user.

Aspect 19: An apparatus for data processing and troubleshooting at a query management service, comprising a processor: memory coupled with the processor; and instructions stored in the memory and executable by the processor to cause the apparatus to perform a method of any of aspects 1 through 18.

Aspect 20: An apparatus for data processing and troubleshooting at a query management service, comprising at least one means for performing a method of any of aspects 1 through 18.

Aspect 21: A non-transitory computer-readable medium storing code for data processing and troubleshooting at a query management service, the code comprising instructions executable by a processor to perform a method of any of aspects 1 through 18.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for data processing and troubleshooting at a query management service, comprising:
   one or more processors;
   memory coupled with the one or more processors; and
   instructions stored in the memory and executable by the one or more processors to cause the apparatus to:
      receive, via a public proxy for communicating internet requests between the query management service and a communication service, an indication of a query from a user of the communication service;
      determine an intent of the query based at least in part on using a third-party natural language processing (NLP) model to analyze the query from the user;
      execute, within a distributed computing environment that includes the query management service and a set of multi-substrate network security services, a sequence of actions that correspond to the intent of the query and includes configuring a security policy for at least one substrate associated with the set of multi-substrate network security services, wherein the at least one substrate comprises an infrastructure underlying a service instance;
      obtain one or more query results based at least in part on executing the sequence of actions within the distributed computing environment; and
      transmit an indication of the one or more query results to the communication service connected to the query management service via the public proxy, wherein the one or more query results are rendered according to feedback information from the user.

2. The apparatus of claim 1, wherein, to execute the sequence of actions, the instructions are executable by the one or more processors to cause the apparatus to:
   retrieve a set of credentials from a secure data repository in the distributed computing environment; and
   extract the one or more query results based at least in part on using the set of credentials from the secure data repository to access the set of multi-substrate network security services via one or more application programming interfaces.

3. The apparatus of claim 1, wherein, to execute the sequence of actions, the instructions are executable by the one or more processors to cause the apparatus to:
   transmit pre-processing information to the communication service before processing the query from the user, the pre-processing information comprising an initial response to the query, an indication that the query management service is actively processing the query, an indication of an expected query response time, a request for additional information from the user, or a combination thereof.

4. The apparatus of claim 1, wherein, to obtain the one or more query results, the instructions are executable by the one or more processors to cause the apparatus to:
   obtain, via at least one service application programming interface, information that pertains to one or more network security service instances or functional domains of the distributed computing environment.

5. The apparatus of claim 1, wherein the intent of the query is checking a connectivity status of a network security service, confirming whether a network security service is accessible from a network within the distributed computing environment, connectivity troubleshooting, debugging network security-related problems, running a security pipeline operation, obtaining security deployment information, acquiring security service details, determining a status of a network security posture, requesting approval of a review pull request, building network security policies, opening or closing a work item, resolving an error, determining a status of an issue, or a combination thereof.

6. The apparatus of claim 1, wherein, to execute the sequence of actions, the instructions are executable by the one or more processors to cause the apparatus to:
   cause a consolidated dialog form to be rendered within a user interface of the communication service, wherein at least a portion of the consolidated dialog form is pre-populated with information extracted from the query.

7. The apparatus of claim 1, wherein, to execute the sequence of actions, the instructions are executable by the one or more processors to cause the apparatus to:
   recursively resolve at least a portion of the query based at least in part on establishing a connection with an external application that is integrated with the communication service.

8. The apparatus of claim 1, wherein, to obtain the one or more query results, the instructions are executable by the one or more processors to cause the apparatus to:
   retrieve the one or more query results from a monitoring service that stores metrics from a plurality of data sources in the distributed computing environment, wherein the one or more query results comprise metrics associated with a network security service pipeline run.

9. The apparatus of claim 1, wherein, to execute the sequence of actions, the instructions are executable by the one or more processors to cause the apparatus to:
   transmit an alert to one or more service owners in response to determining that the query pertains to network security service operations.

10. The apparatus of claim 1, wherein:
    a first thread of the query management service controls periodic data synchronization, a second thread of the query management service controls security posture synchronization, and a third thread of the query management service controls cache handling operations, and
    the first thread, the second thread, and the third thread all operate in parallel.

11. The apparatus of claim 1, wherein, to obtain the one or more query results, the instructions are executable by the one or more processors to cause the apparatus to:
    retrieve the one or more query results from an in-memory cache that is synchronized with a third-party distributed cache.

12. The apparatus of claim 1, wherein, to execute the sequence of actions, the instructions are executable by the one or more processors to cause the apparatus to:
    retrieve, from a third-party document collaboration service, contact information for an on-call user that is responsible for handling queries pertaining to network security services; and
    transmit an indication of the query to the on-call user.

13. The apparatus of claim 1, wherein the instructions are further executable by the one or more processors to cause the apparatus to:
    establish a bidirectional socket connection with at least one of the communication service, a third-party messaging application, a third-party work item tracking system, a third-party document collaboration service, or a third-party NLP application via the public proxy, wherein the one or more query results are obtained via the bidirectional socket connection.

14. The apparatus of claim 1, wherein the instructions are further executable by the one or more processors to cause the apparatus to:
perform an automated NLP tuning process to determine a score for the one or more query results using historic query resolution feedback from the user of the communication service; and
cause the one or more query results to be rendered according to a result of the automated NLP tuning process.

15. The apparatus of claim 1, wherein the instructions are further executable by the one or more processors to cause the apparatus to:
perform a combination of automatic scaling and load balancing operations to reduce a query response time of the query management service if a number of queries received per minute satisfies a threshold.

16. The apparatus of claim 1, wherein the instructions are further executable by the one or more processors to cause the apparatus to:
generate a dynamic dashboard that includes statistics associated with queries received and processed by the query management service within a time interval, wherein at least one user interface element of the dynamic dashboard is customized by the user based on user type.

17. The apparatus of claim 1, wherein the set of multi-substrate network security services are distributed across a plurality of third-party hosting environments.

18. The apparatus of claim 1, wherein the query management service supports a workflow-based interaction mode and a conversation-based interaction mode, the workflow-based interaction mode providing user interface forms that are customized based at least in part on historic usage information associated with the user and a type of the user, the conversation-based interaction mode providing conversational questions and responses that are customized based at least in part on the historic usage information and the type of the user.

19. A method for data processing and troubleshooting at a query management service, comprising:
receiving, via a public proxy for communicating internet requests between the query management service and a communication service, an indication of a query from a user of the communication service;
determining an intent of the query based at least in part on using a third-party natural language processing (NLP) model and customized logic to analyze the query from the user;
executing, within a distributed computing environment that includes the query management service and a set of multi-substrate network security services, a sequence of actions that correspond to the intent of the query and includes configuring a security policy for at least one substrate associated with the set of multi-substrate network security services, wherein the at least one substrate comprises an infrastructure underlying a service instance;
obtaining one or more query results based at least in part on executing the sequence of actions within the distributed computing environment; and
transmitting an indication of the one or more query results to the communication service connected to the query management service via the public proxy, wherein the one or more query results are rendered according to feedback information from the user.

20. A non-transitory computer-readable medium storing code for data processing and troubleshooting at a query management service, the code comprising instructions executable by one or more processors to:
receive, public proxy for communicating internet requests between the query management service and a communication service, an indication of a query from a user of the communication service;
determine an intent of the query based at least in part on using a third-party natural language processing (NLP) model and customized logic to analyze the query from the user;
execute, within a distributed computing environment that includes the query management service and a set of multi-substrate network security services, a sequence of actions that correspond to the intent of the query and includes configuring a security policy for at least one substrate associated with the set of multi-substrate network security services, wherein the at least one substrate comprises an infrastructure underlying a service instance;
obtain one or more query results based at least in part on executing the sequence of actions within the distributed computing environment; and
transmit an indication of the one or more query results to the communication service connected to the query management service via the public proxy, wherein the one or more query results are rendered according to feedback information from the user.

* * * * *